(12) United States Patent
Giobbi

(10) Patent No.: US 12,731,151 B2
(45) Date of Patent: Sep. 8, 2026

(54) TWO-LEVEL AUTHENTICATION FOR SECURE TRANSACTIONS

(71) Applicant: Proxense, LLC, Bend, OR (US)

(72) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 92 days.

(21) Appl. No.: 17/504,231

(22) Filed: Oct. 18, 2021

(65) Prior Publication Data

US 2022/0036368 A1 Feb. 3, 2022

Related U.S. Application Data

(63) Continuation of application No. 15/973,089, filed on May 7, 2018, now Pat. No. 11,157,909, which is a (Continued)

(51) Int. Cl.
*G06Q 20/40* (2012.01)
*G06F 21/32* (2013.01)
(Continued)

(52) U.S. Cl.
CPC ........... *G06Q 20/409* (2013.01); *G06F 21/32* (2013.01); *G06Q 20/327* (2013.01); (Continued)

(58) Field of Classification Search
CPC ......... G06Q 20/20–209; G06Q 20/409–40975
See application file for complete search history.

(56) References Cited

U.S. PATENT DOCUMENTS 3,665,313 A 5/1972 Trent
3,739,329 A 6/1973 Lester
(Continued)

FOREIGN PATENT DOCUMENTS

EP 1478152 A2 11/2004
EP 1536306 A1 6/2005
(Continued)

OTHER PUBLICATIONS

Nilsson et al., "Match-on-Card for Java Cards," Precise Biometrics, white paper, Apr. 2004, retrieved from www.ibia. org/membersadmin/whitepapers/pdf/17/Precise%20Match-on-Card%20for%20Java%20Cards.pdf on Jan. 7, 2007, 5 pgs.
(Continued)

*Primary Examiner* — Jay Huang
(74) *Attorney, Agent, or Firm* — Patent Law Works, LLP

(57) ABSTRACT

A system and method provide efficient, secure, and highly reliable authentication for transaction processing and/or access control applications. A Personal Digital Key stores one or more profiles (e.g., a biometric profile) in a tamper-proof memory that is acquired in a secure trusted process. Biometric profiles comprise a representation of physical or behavioral characteristics that are uniquely associated with an individual that owns and carries the PDK. The PDK wirelessly transmits the biometric profile over a secure wireless transaction to a Reader for use in a biometric authentication process. The Reader compares the received biometric profile to a biometric input acquired at the point of transaction in order to determine if the transaction should be authorized.

20 Claims, 8 Drawing Sheets

Related U.S. Application Data continuation of application No. 13/857,905, filed on Apr. 5, 2013, now Pat. No. 9,990,628, which is a continuation of application No. 11/744,831, filed on May 5, 2007, now Pat. No. 8,433,919.

(60) Provisional application No. 60/894,608, filed on Mar. 13, 2007, provisional application No. 60/824,758, filed on Sep. 6, 2006, provisional application No. 60/838,788, filed on Aug. 17, 2006, provisional application No. 60/798,843, filed on May 8, 2006, provisional application No. 60/798,172, filed on May 5, 2006.

(51) Int. Cl.

| | |
|---|---|
| ***G06F 21/34*** | (2013.01) |
| ***G06Q 20/32*** | (2012.01) |
| ***G07C 9/25*** | (2020.01) |
| ***G07C 9/26*** | (2020.01) |
| ***G07F 7/10*** | (2006.01) |
| ***H04L 9/08*** | (2006.01) |
| ***H04L 9/32*** | (2006.01) |
| ***H04L 9/40*** | (2022.01) |
| ***H04W 12/06*** | (2021.01) |

(52) U.S. Cl.

CPC ... *G06Q 20/40145* (2013.01); *H04L 63/0861* (2013.01); *G06F 21/34* (2013.01); *G06F 2221/2115* (2013.01); *G07C 9/257* (2020.01); *G07C 9/26* (2020.01); *G07C 2209/12* (2013.01); *G07F 7/1008* (2013.01); *H04L 9/0866* (2013.01); *H04L 9/3231* (2013.01); *H04L 2209/56* (2013.01); *H04L 2209/80* (2013.01); *H04W 12/06* (2013.01); *H04W 12/068* (2021.01)

(56) References Cited

U.S. PATENT DOCUMENTS 3,761,883 A 9/1973 Alvarez et al.
3,906,166 A 9/1975 Cooper et al.
4,101,873 A 7/1978 Anderson et al.
4,430,705 A 2/1984 Cannavino et al.
4,476,469 A 10/1984 Lander
4,598,272 A 7/1986 Cox
4,661,821 A 4/1987 Smith
4,736,094 A 4/1988 Yoshida
4,759,060 A 7/1988 Hayashi et al.
4,814,742 A 3/1989 Morita et al.
4,871,997 A 10/1989 Adriaenssens et al.
4,993,068 A 2/1991 Piosenka et al.
5,043,702 A 8/1991 Kuo
5,052,049 A 9/1991 Andros et al.
5,187,352 A 2/1993 Blair et al.
5,212,369 A 5/1993 Karlisch et al.
5,224,164 A 6/1993 Elsner
5,296,641 A 3/1994 Stelzel
5,307,349 A 4/1994 Shloss et al.
5,317,572 A 5/1994 Satoh
5,325,285 A 6/1994 Araki
5,392,287 A 2/1995 Tiedemann et al.
5,392,433 A 2/1995 Hammersley et al.
5,410,588 A 4/1995 Ito
5,416,780 A 5/1995 Patel
5,422,632 A 6/1995 Bucholtz et al.
5,428,684 A 6/1995 Akiyama et al.
5,450,489 A 9/1995 Ostrover et al.
5,473,690 A 12/1995 Grimonprez et al.
5,481,265 A 1/1996 Russell
5,506,863 A 4/1996 Meidan et al.
5,517,502 A 5/1996 Bestler et al.
5,530,232 A 6/1996 Taylor
5,541,583 A 7/1996 Mandelbaum
5,544,321 A 8/1996 Theimer et al.
5,552,776 A 9/1996 Wade et al.
5,563,947 A 10/1996 Kikinis
5,578,808 A 11/1996 Taylor
5,589,838 A 12/1996 Mcewan
5,594,227 A 1/1997 Deo
5,598,474 A 1/1997 Johnson
5,611,050 A 3/1997 Theimer et al.
5,615,277 A 3/1997 Hoffman
5,619,251 A 4/1997 Kuroiwa et al.
5,623,552 A 4/1997 Lane
5,629,980 A 5/1997 Stefik et al.
5,644,354 A 7/1997 Thompson et al.
5,666,412 A 9/1997 Handelman et al.
5,689,529 A 11/1997 Johnson
5,692,049 A 11/1997 Johnson et al.
5,708,423 A 1/1998 Ghaffari et al.
5,719,387 A 2/1998 Fujioka
5,729,237 A 3/1998 Webb
5,760,705 A 6/1998 Glessner et al.
5,760,744 A 6/1998 Sauer
5,773,954 A 6/1998 Vanhorn
5,784,464 A 7/1998 Akiyama et al.
5,799,085 A 8/1998 Shona
5,821,854 A 10/1998 Dorinski et al.
5,825,876 A 10/1998 Peterson, Jr.
5,835,595 A 11/1998 Fraser et al.
5,838,306 A 11/1998 O'Connor et al.
5,854,891 A 12/1998 Postlewaite et al.
5,857,020 A 1/1999 Peterson, Jr.
5,886,634 A 3/1999 Muhme
5,892,825 A 4/1999 Mages et al.
5,892,900 A 4/1999 Ginter et al.
5,894,551 A 4/1999 Huggins et al.
5,898,880 A 4/1999 Ryu
5,910,776 A 6/1999 Black
5,917,913 A 6/1999 Wang
5,923,757 A 7/1999 Hocker et al.
5,928,327 A 7/1999 Wang et al.
5,942,985 A 8/1999 Chin
5,991,399 A 11/1999 Graunke et al.
5,991,749 A 11/1999 Morrill, Jr.
6,009,333 A 12/1999 Chaco
6,016,476 A 1/2000 Maes et al.
6,018,739 A 1/2000 Mccoy et al.
6,025,780 A 2/2000 Bowers et al.
6,035,038 A 3/2000 Campinos et al.
6,035,329 A 3/2000 Mages et al.
6,038,334 A 3/2000 Hamid
6,038,549 A 3/2000 Davis et al.
6,038,666 A 3/2000 Hsu et al.
6,040,786 A 3/2000 Fujioka
6,041,410 A 3/2000 Hsu et al.
6,042,006 A 3/2000 Van Tilburg et al.
6,044,470 A 3/2000 Kuriyama
6,045,039 A 4/2000 Stinson et al.
6,052,468 A 4/2000 Hillhouse
6,055,314 A 4/2000 Spies et al.
6,068,184 A 5/2000 Barnett
6,069,647 A 5/2000 Sullivan et al.
6,070,796 A 6/2000 Sirbu
6,076,164 A 6/2000 Tanaka et al.
6,088,450 A 7/2000 Davis et al.
6,088,730 A 7/2000 Kato et al.
6,104,290 A 8/2000 Naguleswaran
6,104,334 A 8/2000 Allport
6,110,041 A 8/2000 Walker et al.
6,121,544 A 9/2000 Petsinger
6,134,283 A 10/2000 Sands et al.
6,137,480 A 10/2000 Shintani
6,138,010 A 10/2000 Rabe et al.
6,148,142 A 11/2000 Anderson
6,148,210 A 11/2000 Elwin et al.
6,161,179 A 12/2000 Seidel
6,175,921 B1 1/2001 Rosen
6,177,887 B1 1/2001 Jerome
6,185,316 B1 2/2001 Buffam
6,189,105 B1 2/2001 Lopes

(56) References Cited

U.S. PATENT DOCUMENTS 6,209,089 B1 3/2001 Selitrennikoff et al.
6,219,109 B1 4/2001 Raynesford et al.
6,219,439 B1 4/2001 Burger
6,219,553 B1 4/2001 Panasik
6,237,848 B1 5/2001 Everett
6,240,076 B1 5/2001 Kanerva et al.
6,247,130 B1 6/2001 Fritsch
6,249,869 B1 6/2001 Drupsteen et al.
6,250,557 B1 6/2001 Forslund et al.
6,256,737 B1 7/2001 Bianco et al.
6,266,415 B1 7/2001 Campinos et al.
6,270,011 B1 8/2001 Gottfried
6,279,111 B1 8/2001 Jensenworth et al.
6,279,146 B1 8/2001 Evans et al.
6,295,057 B1 9/2001 Rosin et al.
6,307,471 B1 10/2001 Xydis
6,317,755 B1 11/2001 Rakers et al.
6,325,285 B1 12/2001 Baratelli
6,336,121 B1 1/2002 Lyson et al.
6,336,142 B1 1/2002 Kato et al.
6,343,280 B2 1/2002 Clark
6,345,347 B1 2/2002 Biran
6,363,485 B1 3/2002 Adams et al.
6,367,019 B1 4/2002 Ansell et al.
6,369,693 B1 4/2002 Gibson
6,370,376 B1 4/2002 Sheath
6,381,029 B1 4/2002 Tipirneni
6,381,747 B1 4/2002 Wonfor et al.
6,385,596 B1 5/2002 Wiser et al.
6,392,664 B1 5/2002 White et al.
6,397,387 B1 5/2002 Rosin et al.
6,401,059 B1 6/2002 Shen et al.
6,411,307 B1 6/2002 Rosin et al.
6,424,249 B1 7/2002 Houvener
6,424,715 B1 7/2002 Saito
6,425,084 B1 7/2002 Rallis et al.
6,434,403 B1 8/2002 Ausems et al.
6,434,535 B1 8/2002 Kupka et al.
6,446,004 B1 9/2002 Cao et al.
6,446,130 B1 9/2002 Grapes
6,456,958 B1 9/2002 Xydis
6,463,534 B1 10/2002 Geiger et al.
6,480,101 B1 11/2002 Kelly et al.
6,480,188 B1 11/2002 Horsley
6,484,182 B1 11/2002 Dunphy et al.
6,484,260 B1 11/2002 Scott et al.
6,484,946 B2 11/2002 Matsumoto et al.
6,487,663 B1 11/2002 Jaisimha et al.
6,490,443 B1 12/2002 Freeny, Jr.
6,510,350 B1 1/2003 Steen et al.
6,522,253 B1 2/2003 Saltus
6,523,113 B1 2/2003 Wehrenberg
6,529,949 B1 3/2003 Getsin et al.
6,546,418 B2 4/2003 Schena et al.
6,550,011 B1 4/2003 Sims, III
6,563,465 B2 5/2003 Frecska
6,563,805 B1 5/2003 Ma et al.
6,564,380 B1 5/2003 Murphy
6,577,238 B1 6/2003 Whitesmith et al.
6,593,887 B2 7/2003 Luk et al.
6,597,680 B1 7/2003 Lindskog et al.
6,607,136 B1 8/2003 Atsmon et al.
6,621,528 B1 9/2003 Kessler et al.
6,624,752 B2 9/2003 Klitsgaard et al.
6,628,302 B2 9/2003 White et al.
6,632,992 B2 10/2003 Hasegawa
6,633,981 B1 10/2003 Davis
6,645,077 B2 11/2003 Rowe
6,647,417 B1 11/2003 Hunter et al.
6,657,538 B1 12/2003 Ritter
6,658,566 B1 12/2003 Hazard
6,667,684 B1 12/2003 Waggamon et al.
6,669,096 B1 12/2003 Saphar et al.
6,671,808 B1 12/2003 Abbott et al.
6,683,954 B1 1/2004 Searle
6,695,207 B1 2/2004 Norris, Jr.
6,697,944 B1 2/2004 Jones et al.
6,709,333 B1 3/2004 Bradford et al.
6,711,464 B1 3/2004 Yap et al.
6,714,168 B2 3/2004 Berenbaum
6,715,246 B1 4/2004 Frecska et al.
6,728,397 B2 4/2004 McNeal
6,737,955 B2 5/2004 Ghabra et al.
6,738,772 B2 * 5/2004 Regelski ................ G06F 16/27
707/999.009
6,758,394 B2 7/2004 Maskatiya et al.
6,771,969 B1 8/2004 Chinoy et al.
6,775,655 B1 8/2004 Peinado et al.
6,785,474 B2 8/2004 Hirt et al.
6,788,640 B2 9/2004 Celeste
6,788,924 B1 9/2004 Knutson et al.
6,795,425 B1 9/2004 Raith
6,804,825 B1 10/2004 White et al.
6,806,887 B2 10/2004 Chernock et al.
6,819,219 B1 11/2004 Bolle et al.
6,839,542 B2 1/2005 Sibecas et al.
6,839,772 B1 1/2005 Kowalski et al.
6,850,147 B2 2/2005 Prokoski et al.
6,853,988 B1 2/2005 Dickinson et al.
6,859,812 B1 2/2005 Poynor
6,861,980 B1 3/2005 Rowitch et al.
6,871,063 B1 3/2005 Schiffer
6,873,975 B1 3/2005 Hatakeyama et al.
6,879,567 B2 4/2005 Callaway et al.
6,879,966 B1 4/2005 Lapsley et al.
6,886,741 B1 5/2005 Salveson
6,889,067 B2 5/2005 Willey
6,891,822 B1 5/2005 Gubbi et al.
6,892,307 B1 5/2005 Wood et al.
6,930,643 B2 8/2005 Byrne et al.
6,934,855 B1 8/2005 Kipnis et al.
6,947,003 B2 9/2005 Huor
6,950,941 B1 9/2005 Lee et al.
6,957,086 B2 10/2005 Bahl et al.
6,961,858 B2 11/2005 Fransdonk
6,963,270 B1 11/2005 Gallagher et al.
6,963,971 B1 11/2005 Bush et al.
6,973,576 B2 12/2005 Giobbi
6,975,202 B1 12/2005 Rodriguez et al.
6,980,087 B2 12/2005 Zukowski
6,983,882 B2 1/2006 Cassone
6,999,032 B2 2/2006 Pakray et al.
7,012,503 B2 3/2006 Nielsen
7,020,635 B2 3/2006 Hamilton et al.
7,020,785 B2 3/2006 Kim et al.
7,031,945 B1 4/2006 Donner
7,049,963 B2 5/2006 Waterhouse et al.
7,055,171 B1 5/2006 Martin et al.
7,058,806 B2 6/2006 Smeets et al.
7,061,380 B1 6/2006 Orlando et al.
7,068,623 B1 6/2006 Barany et al.
7,072,900 B2 7/2006 Sweitzer et al.
7,079,079 B2 7/2006 Jo et al.
7,080,049 B2 7/2006 Truitt et al.
7,082,415 B1 7/2006 Robinson et al.
7,090,126 B2 8/2006 Kelly et al.
7,090,128 B2 8/2006 Farley et al.
7,100,053 B1 8/2006 Brown et al.
7,107,455 B1 9/2006 Merkin
7,107,462 B2 9/2006 Fransdonk
7,111,789 B2 9/2006 Rajasekaran et al.
7,112,138 B2 9/2006 Hedrick et al.
7,119,659 B2 10/2006 Bonalle et al.
7,123,149 B2 10/2006 Nowak et al.
7,130,668 B2 10/2006 Chang et al.
7,131,139 B1 10/2006 Meier
7,137,008 B1 11/2006 Hamid et al.
7,137,012 B1 11/2006 Kamibayashi et al.
7,139,914 B2 11/2006 Arnouse
7,150,045 B2 12/2006 Koelle et al.
7,155,416 B2 12/2006 Shatford
7,159,114 B1 1/2007 Zajkowski et al.
7,159,765 B2 1/2007 Frerking
7,167,987 B2 1/2007 Angelo

(56) References Cited

U.S. PATENT DOCUMENTS 7,168,089 B2 1/2007 Nguyen et al.
7,176,797 B2 2/2007 Zai et al.
7,185,363 B1 2/2007 Narin et al.
7,188,110 B1 3/2007 Ludtke et al.
7,191,466 B1 3/2007 Hamid et al.
7,194,438 B2 3/2007 Sovio et al.
7,209,955 B1 4/2007 Major et al.
7,218,944 B2 5/2007 Cromer et al.
7,225,161 B2 5/2007 Lam et al.
7,230,908 B2 6/2007 Vanderaar et al.
7,231,068 B2 6/2007 Tibor
7,231,451 B2 6/2007 Law et al.
7,239,226 B2 7/2007 Berardi et al.
7,239,241 B2 7/2007 Claudatos et al.
7,242,923 B2 7/2007 Perera et al.
7,245,221 B2 7/2007 Claudatos et al.
7,249,177 B1 7/2007 Miller
7,272,723 B1 9/2007 Abbott et al.
7,277,737 B1 10/2007 Vollmer et al.
7,278,025 B2 10/2007 Saito et al.
7,283,650 B1 10/2007 Sharma et al.
7,295,106 B1 11/2007 Jackson et al.
7,295,119 B2 11/2007 Rappaport et al.
7,305,560 B2 12/2007 Giobbi
7,310,042 B2 12/2007 Seifert
7,314,164 B2 1/2008 Bonalle et al.
7,317,799 B2 1/2008 Hammersmith et al.
7,319,395 B2 1/2008 Puzio et al.
7,323,991 B1 1/2008 Eckert et al.
7,330,108 B2 2/2008 Thomas
7,333,002 B2 2/2008 Bixler et al.
7,333,615 B1 2/2008 Jarboe et al.
7,336,181 B2 2/2008 Nowak et al.
7,336,182 B1 2/2008 Baranowski et al.
7,337,326 B2 2/2008 Palmer et al.
7,341,181 B2 3/2008 Bonalle et al.
7,342,503 B1 3/2008 Light et al.
7,349,557 B2 3/2008 Tibor
7,356,393 B1 4/2008 Schlatre et al.
7,356,706 B2 4/2008 Scheurich
7,361,919 B2 4/2008 Setlak
7,363,494 B2 4/2008 Brainard et al.
7,370,366 B2 5/2008 Lacan et al.
7,378,939 B2 5/2008 Sengupta et al.
7,380,202 B1 5/2008 Lindhorst et al.
7,382,799 B1 6/2008 Young et al.
7,387,235 B2 6/2008 Gilbert et al.
7,401,731 B1 7/2008 Pletz et al.
7,404,088 B2 7/2008 Giobbi
7,408,799 B1 8/2008 Kang
7,424,134 B2 9/2008 Chou
7,437,330 B1 10/2008 Robinson et al.
7,443,297 B1 10/2008 Baranowski et al.
7,447,911 B2 11/2008 Chou et al.
7,448,087 B2 11/2008 Ohmori et al.
7,458,510 B1 12/2008 Zhou
7,460,836 B2 12/2008 Smith et al.
7,461,444 B2 12/2008 Deaett et al.
7,464,053 B1 12/2008 Pylant
7,464,059 B1 12/2008 Robinson et al.
7,466,232 B2 12/2008 Neuwirth
7,472,280 B2 12/2008 Giobbi
7,477,285 B1 1/2009 Johnson
7,512,806 B2 3/2009 Lemke
7,525,413 B2 4/2009 Jung et al.
7,529,944 B2 5/2009 Hamid
7,533,809 B1 5/2009 Robinson et al.
7,545,312 B2 6/2009 Kiang et al.
7,552,872 B2 6/2009 Tokita et al.
7,565,329 B2 7/2009 Lapsley et al.
7,573,382 B2 8/2009 Choubey et al.
7,573,841 B2 8/2009 Lee et al.
7,574,734 B2 8/2009 Fedronic et al.
7,578,442 B2 8/2009 Knowles et al.
7,583,238 B2 9/2009 Cassen et al.
7,583,643 B2 9/2009 Smith et al.
7,587,502 B2 9/2009 Crawford et al.
7,587,611 B2 9/2009 Johnson et al.
7,594,611 B1 9/2009 Arrington, III
7,595,765 B1 9/2009 Hirsch et al.
7,603,564 B2 10/2009 Adachi
7,606,733 B2 10/2009 Shmueli et al.
7,617,523 B2 11/2009 Das et al.
7,620,184 B2 11/2009 Marque Pucheu
7,624,073 B1 11/2009 Robinson et al.
7,624,417 B2 11/2009 Dua
7,640,273 B2 12/2009 Wallmeier et al.
7,644,043 B2 * 1/2010 Minowa ............... G06Q 20/341
382/137
7,644,443 B2 1/2010 Matsuyama et al.
7,646,307 B2 1/2010 Plocher et al.
7,652,892 B2 1/2010 Shiu et al.
7,653,883 B2 1/2010 Hotelling et al.
7,676,380 B2 3/2010 Graves et al.
7,681,050 B2 3/2010 Blom et al.
7,689,005 B2 3/2010 Wang et al.
7,701,858 B2 4/2010 Werb et al.
7,706,896 B2 4/2010 Music et al.
7,711,152 B1 5/2010 Davida et al.
7,711,586 B2 5/2010 Aggarwal et al.
7,715,593 B1 5/2010 Adams et al.
7,724,713 B2 5/2010 Del Prado Pavon et al.
7,724,717 B2 5/2010 Porras et al.
7,724,720 B2 5/2010 Korpela et al.
7,726,566 B2 6/2010 Brown et al.
7,734,476 B2 6/2010 Wildman et al.
7,764,236 B2 7/2010 Hill et al.
7,765,164 B1 7/2010 Robinson et al.
7,765,181 B2 7/2010 Thomas et al.
7,768,960 B1 8/2010 Barratt
7,773,754 B2 8/2010 Buer et al.
7,774,613 B2 8/2010 Lemke
7,780,082 B2 8/2010 Handa et al.
7,796,551 B1 9/2010 Machiraju et al.
7,813,822 B1 10/2010 Hoffberg
7,865,448 B2 1/2011 Pizarro
7,865,937 B1 1/2011 White et al.
7,883,003 B2 2/2011 Giobbi et al.
7,883,417 B2 2/2011 Bruzzese et al.
7,904,718 B2 3/2011 Giobbi et al.
7,943,868 B2 5/2011 Anders et al.
7,957,536 B2 6/2011 Nolte
7,961,078 B1 6/2011 Reynolds et al.
7,984,064 B2 7/2011 Fusari
7,996,514 B2 8/2011 Baumert et al.
8,026,821 B2 9/2011 Reeder et al.
8,036,152 B2 10/2011 Brown et al.
8,041,582 B2 10/2011 Godschall et al.
8,049,594 B1 11/2011 Baranowski
8,077,041 B2 12/2011 Stern et al.
8,081,215 B2 12/2011 Kuo et al.
8,082,160 B2 12/2011 Collins et al.
8,089,354 B2 1/2012 Perkins
8,112,066 B2 2/2012 Ben Ayed
8,117,125 B1 * 2/2012 Kawan ............. G06Q 20/38215
705/40
8,125,624 B2 2/2012 Jones et al.
8,135,624 B1 3/2012 Ramalingam et al.
8,171,528 B1 5/2012 Brown
8,193,923 B2 6/2012 Rork et al.
8,200,980 B1 6/2012 Robinson et al.
8,215,552 B1 7/2012 Rambadt
8,219,129 B2 7/2012 Brown et al.
8,248,263 B2 8/2012 Shervey et al.
8,258,942 B1 9/2012 Lanzone et al.
8,284,748 B2 10/2012 Borghei
8,294,554 B2 10/2012 Shoarinejad et al.
8,296,573 B2 10/2012 Bolle et al.
8,307,414 B2 11/2012 Zerfos et al.
8,325,011 B2 12/2012 Butler et al.
8,327,151 B2 12/2012 Awatsu et al.
8,333,317 B2 12/2012 Buer et al.
8,340,672 B2 12/2012 Brown et al.
8,352,730 B2 1/2013 Giobbi

(56) References Cited

U.S. PATENT DOCUMENTS 8,373,562 B1 2/2013 Heinze et al.
8,387,124 B2 2/2013 Smetters et al.
8,390,456 B2 3/2013 Puleston et al.
8,395,484 B2 3/2013 Fullerton
8,410,906 B1 4/2013 Dacus et al.
8,412,949 B2 4/2013 Giobbi et al.
8,421,606 B2 4/2013 Collins et al.
8,424,079 B2 4/2013 Adams et al.
8,432,262 B2 4/2013 Talty et al.
8,433,919 B2 4/2013 Giobbi et al.
8,448,858 B1 5/2013 Kundu et al.
8,457,672 B2 6/2013 Brown et al.
8,467,969 B2 6/2013 Nielsen et al.
8,473,748 B2 6/2013 Sampas
8,484,696 B2 7/2013 Gatto et al.
8,494,576 B1 7/2013 Bye et al.
8,508,336 B2 8/2013 Giobbi et al.
8,511,555 B2 8/2013 Babcock et al.
8,519,823 B2 8/2013 Rinkes
8,522,019 B2 8/2013 Michaelis
8,558,699 B2 10/2013 Butler et al.
8,572,391 B2 10/2013 Golan et al.
8,577,091 B2 11/2013 Ivanov et al.
8,600,674 B1 12/2013 Barbeau et al.
8,646,042 B1 2/2014 Brown
8,659,427 B2 2/2014 Brown et al.
8,678,273 B2 3/2014 Mcneal
8,717,346 B2 5/2014 Claessen
8,738,925 B1 5/2014 Park et al.
8,799,574 B2 8/2014 Corda
8,838,993 B2 9/2014 Giobbi et al.
8,856,539 B2 10/2014 Weiss
8,857,716 B1 10/2014 Giobbi et al.
8,886,954 B1 11/2014 Giobbi
8,907,861 B2 12/2014 Hirt
8,914,477 B2 12/2014 Gammon
8,918,854 B1 12/2014 Giobbi
8,931,698 B2 1/2015 Ishikawa et al.
8,977,860 B2 3/2015 Barrus et al.
8,979,646 B2 3/2015 Moser et al.
9,020,854 B2 4/2015 Giobbi
9,024,719 B1 5/2015 Saunders
9,037,140 B1 5/2015 Brown
9,042,819 B2 5/2015 Dua
9,049,188 B1 6/2015 Brown
9,098,954 B1 8/2015 Byrd
9,113,464 B2 8/2015 Brown et al.
9,165,233 B2 10/2015 Testanero
9,189,788 B1 11/2015 Robinson et al.
9,230,399 B2 1/2016 Yacenda
9,235,700 B1 1/2016 Brown
9,251,326 B2 2/2016 Giobbi et al.
9,251,332 B2 2/2016 Giobbi
9,265,043 B2 2/2016 Brown et al.
9,265,450 B1 2/2016 Giobbi
9,269,221 B2 2/2016 Brown et al.
9,276,914 B2 3/2016 Woodward et al.
9,298,905 B1 3/2016 Giobbi
9,305,312 B2 4/2016 Kountotsis et al.
9,322,974 B1 4/2016 Giobbi
9,405,898 B2 8/2016 Giobbi
9,418,205 B2 8/2016 Giobbi
9,430,624 B1 8/2016 Mortensen et al.
9,450,956 B1 9/2016 Giobbi
9,542,542 B2 1/2017 Giobbi et al.
9,613,483 B2 4/2017 Giobbi
9,679,289 B1 6/2017 Brown
9,728,080 B1 8/2017 Giobbi et al.
9,807,091 B2 10/2017 Giobbi
9,830,504 B2 11/2017 Masood et al.
9,892,250 B2 2/2018 Giobbi
9,898,662 B2 2/2018 Tsuda et al.
9,904,816 B1 2/2018 Giobbi et al.
9,990,628 B2 6/2018 Giobbi
10,026,253 B2 7/2018 Giobbi
10,073,960 B1 9/2018 Brown
10,110,385 B1 10/2018 Rush et al.
10,140,073 B2 11/2018 Chang et al.
10,171,460 B2 1/2019 Giobbi
10,217,339 B1 2/2019 Giobbi
10,229,294 B1 3/2019 Giobbi et al.
10,303,867 B2 5/2019 Snke
10,313,336 B2 6/2019 Giobbi
10,334,541 B1 6/2019 Brown
10,341,483 B2 7/2019 Dods et al.
10,362,483 B2 7/2019 Frusina
10,374,795 B1 8/2019 Giobbi et al.
10,383,112 B2 8/2019 Brown et al.
10,403,128 B2 9/2019 Giobbi et al.
10,405,181 B2 9/2019 Li et al.
10,437,976 B2 10/2019 Giobbi
10,455,533 B2 10/2019 Brown
10,469,456 B1 11/2019 Giobbi
10,567,965 B2 2/2020 Boettcher et al.
10,572,700 B2 2/2020 Sengstaken et al.
10,698,989 B2 6/2020 Giobbi
10,755,300 B2 8/2020 Goodhart et al.
10,764,044 B1 9/2020 Giobbi et al.
10,769,939 B2 9/2020 Brown et al.
10,817,964 B2 10/2020 Guillama et al.
10,856,148 B2 12/2020 Li et al.
10,902,723 B2 1/2021 Doyle, III
10,909,229 B2 2/2021 Giobbi
10,929,869 B2 2/2021 Rosenberg
10,943,471 B1 3/2021 Giobbi et al.
11,086,979 B1 8/2021 Giobbi
11,212,797 B2 12/2021 Brown et al.
11,219,022 B2 1/2022 Brown et al.
11,562,644 B2 1/2023 Brown et al.
11,914,695 B2 2/2024 Giobbi
2001/0000535 A1 4/2001 Lapsley et al.
2001/0011276 A1 8/2001 Durst et al.
2001/0014885 A1 8/2001 Yanagi
2001/0018763 A1 8/2001 Ikeda et al.
2001/0021950 A1 9/2001 Hawley et al.
2001/0024428 A1 9/2001 Onouchi
2001/0026619 A1 10/2001 Howard et al.
2001/0027121 A1 10/2001 Boesen
2001/0027439 A1 10/2001 Holtzman et al.
2001/0034659 A1 10/2001 Kobayashi
2001/0036297 A1 11/2001 Ikegami et al.
2001/0044337 A1 11/2001 Rowe et al.
2002/0004783 A1 1/2002 Paltenghe et al.
2002/0007456 A1 1/2002 Peinado et al.
2002/0010679 A1 1/2002 Felsher
2002/0013772 A1 1/2002 Peinado
2002/0014954 A1 2/2002 Fitzgibbon et al.
2002/0015008 A1 2/2002 Kishida et al.
2002/0015494 A1 2/2002 Nagai et al.
2002/0019811 A1 2/2002 Lapsley et al.
2002/0022455 A1 2/2002 Salokannel et al.
2002/0023032 A1 2/2002 Pearson et al.
2002/0023217 A1 2/2002 Wheeler et al.
2002/0026424 A1 2/2002 Akashi
2002/0037732 A1 3/2002 Gous et al.
2002/0046336 A1 4/2002 Kon et al.
2002/0049806 A1 4/2002 Gatz et al.
2002/0052193 A1 5/2002 Chetty
2002/0055908 A1 5/2002 Di Giorgio et al.
2002/0056043 A1 5/2002 Glass
2002/0059114 A1 5/2002 Cockrill et al.
2002/0062249 A1 5/2002 Iannacci
2002/0064074 A1 5/2002 Kamise et al.
2002/0065778 A1 5/2002 Bouet et al.
2002/0068605 A1 6/2002 Stanley
2002/0069364 A1 6/2002 Dosch
2002/0071416 A1 6/2002 Carlson et al.
2002/0071559 A1 6/2002 Christensen et al.
2002/0073042 A1 6/2002 Maritzen et al.
2002/0073293 A1 6/2002 Mac et al.
2002/0076051 A1 6/2002 Nii
2002/0078367 A1 6/2002 Lang et al.
2002/0080969 A1 6/2002 Giobbi
2002/0083178 A1 6/2002 Brothers

(56) References Cited

U.S. PATENT DOCUMENTS

2002/0083318 A1 6/2002 Larose
2002/0086690 A1 7/2002 Takahashi et al.
2002/0089890 A1 7/2002 Fibranz et al.
2002/0091562 A1 7/2002 Siegel et al.
2002/0091646 A1 7/2002 Lake et al.
2002/0095586 A1 7/2002 Doyle et al.
2002/0095587 A1 7/2002 Doyle et al.
2002/0097876 A1 7/2002 Harrison
2002/0098888 A1 7/2002 Rowe et al.
2002/0100798 A1 8/2002 Farrugia et al.
2002/0103027 A1 8/2002 Rowe et al.
2002/0103881 A1 8/2002 Granade et al.
2002/0104006 A1 8/2002 Boate et al.
2002/0104019 A1 8/2002 Chatani et al.
2002/0105918 A1 8/2002 Yamada et al.
2002/0108049 A1 8/2002 Xu et al.
2002/0109580 A1 8/2002 Shreve et al.
2002/0111919 A1 8/2002 Weller et al.
2002/0112183 A1 8/2002 Baird et al.
2002/0115444 A1 8/2002 Yu et al.
2002/0116615 A1 8/2002 Nguyen et al.
2002/0124251 A1 9/2002 Hunter et al.
2002/0128017 A1 9/2002 Virtanen
2002/0128057 A1 9/2002 Walker et al.
2002/0129262 A1 9/2002 Kutaragi et al.
2002/0138438 A1 9/2002 Bardwell
2002/0138445 A1 9/2002 Laage et al.
2002/0138767 A1 9/2002 Hamid et al.
2002/0138768 A1 9/2002 Murakami et al.
2002/0139848 A1 10/2002 Catan
2002/0140542 A1 10/2002 Prokoski et al.
2002/0141586 A1 10/2002 Margalit et al.
2002/0143623 A1 10/2002 Dayley
2002/0143634 A1 10/2002 Kumar et al.
2002/0143655 A1 10/2002 Elston et al.
2002/0144116 A1 10/2002 Giobbi
2002/0144117 A1 10/2002 Faigle
2002/0146347 A1 10/2002 McNeil
2002/0147653 A1 10/2002 Shmueli et al.
2002/0147658 A1 10/2002 Kwan
2002/0147912 A1 10/2002 Shmueli et al.
2002/0148892 A1 10/2002 Bardwell
2002/0150282 A1 10/2002 Kinsella
2002/0152391 A1 10/2002 Willins et al.
2002/0153996 A1 10/2002 Chan et al.
2002/0158121 A1 10/2002 Stanford-Clark
2002/0158750 A1 10/2002 Almalik
2002/0158765 A1 10/2002 Pape et al.
2002/0160820 A1 10/2002 Winkler
2002/0162009 A1 10/2002 Shmueli et al.
2002/0165803 A1 11/2002 Iwase et al.
2002/0174348 A1 11/2002 Ting
2002/0177460 A1 11/2002 Beasley et al.
2002/0178063 A1 11/2002 Gravelle et al.
2002/0184208 A1 12/2002 Kato
2002/0187746 A1 12/2002 Cheng et al.
2002/0191816 A1 12/2002 Maritzen et al.
2002/0196963 A1 12/2002 Bardwell
2002/0199120 A1 12/2002 Schmidt
2003/0001016 A1 1/2003 Fraier et al.
2003/0018522 A1 1/2003 Denimarck et al.
2003/0022701 A1 1/2003 Gupta
2003/0023882 A1 1/2003 Udom
2003/0024975 A1 2/2003 Rajasekharan
2003/0033203 A1 2/2003 Inoue et al.
2003/0034877 A1 2/2003 Miller et al.
2003/0036416 A1 2/2003 Pattabiraman et al.
2003/0036425 A1 2/2003 Kaminkow et al.
2003/0044050 A1 3/2003 Clark et al.
2003/0046228 A1 3/2003 Berney
2003/0046237 A1 3/2003 Uberti
2003/0046552 A1 3/2003 Hamid
2003/0048174 A1 3/2003 Stevens et al.
2003/0051173 A1 3/2003 Krueger
2003/0054868 A1 3/2003 Paulsen et al.
2003/0054881 A1 3/2003 Hedrick et al.
2003/0055689 A1 3/2003 Block et al.
2003/0055792 A1 3/2003 Kinoshita et al.
2003/0061154 A1 3/2003 Chacko
2003/0061172 A1 3/2003 Robinson
2003/0063619 A1 4/2003 Montano et al.
2003/0074575 A1 4/2003 Hoberock et al.
2003/0079133 A1 4/2003 Breiter et al.
2003/0087601 A1 5/2003 Agam et al.
2003/0088441 A1 5/2003 McNerney
2003/0105719 A1 6/2003 Berger et al.
2003/0109274 A1 6/2003 Budka et al.
2003/0115227 A1 6/2003 Guthery
2003/0115351 A1 6/2003 Giobbi
2003/0115473 A1 6/2003 Sugimura et al.
2003/0115474 A1 6/2003 Khan et al.
2003/0117969 A1 6/2003 Koo et al.
2003/0117980 A1 6/2003 Kim et al.
2003/0120934 A1 6/2003 Ortiz
2003/0127511 A1 7/2003 Kelly et al.
2003/0128866 A1 7/2003 Mcneal
2003/0137404 A1 7/2003 Bonneau et al.
2003/0139190 A1 7/2003 Steelberg et al.
2003/0140221 A1 7/2003 Garnett
2003/0142041 A1 7/2003 Barlow et al.
2003/0146835 A1 8/2003 Carter
2003/0149744 A1 8/2003 Bierre et al.
2003/0152059 A1 8/2003 Odman
2003/0156742 A1 8/2003 Witt et al.
2003/0159040 A1 8/2003 Hashimoto et al.
2003/0163388 A1 8/2003 Beane
2003/0167207 A1 9/2003 Berardi et al.
2003/0169697 A1 9/2003 Suzuki et al.
2003/0172028 A1 9/2003 Abell et al.
2003/0172037 A1 9/2003 Jung et al.
2003/0174690 A1 9/2003 Benveniste
2003/0174839 A1 9/2003 Yamagata et al.
2003/0176218 A1 9/2003 Lemay et al.
2003/0177102 A1 9/2003 Robinson
2003/0186739 A1 10/2003 Paulsen et al.
2003/0187787 A1 10/2003 Freund
2003/0189092 A1 10/2003 Takano
2003/0195842 A1 10/2003 Reece
2003/0196084 A1 10/2003 Okereke et al.
2003/0199267 A1 10/2003 Iwasa et al.
2003/0200152 A1 10/2003 Divekar
2003/0204526 A1 10/2003 Salehi-Had
2003/0204721 A1 10/2003 Barrus et al.
2003/0213840 A1 11/2003 Livingston et al.
2003/0218533 A1 11/2003 Flick
2003/0223394 A1 12/2003 Parantainen et al.
2003/0225703 A1 12/2003 Angel
2003/0226031 A1 12/2003 Proudler et al.
2003/0227382 A1 12/2003 Breed
2003/0233458 A1 12/2003 Kwon et al.
2004/0002347 A1 1/2004 Hoctor et al.
2004/0015403 A1 1/2004 Moskowitz et al.
2004/0021552 A1 2/2004 Koo
2004/0022384 A1 2/2004 Flores et al.
2004/0025179 A1 2/2004 Russ et al.
2004/0029620 A1 2/2004 Karaoguz
2004/0029635 A1 2/2004 Giobbi
2004/0030764 A1 2/2004 Birk et al.
2004/0030894 A1 2/2004 Labrou et al.
2004/0035644 A1 2/2004 Ford et al.
2004/0039909 A1 2/2004 Cheng
2004/0043753 A1 3/2004 Wake et al.
2004/0044627 A1 3/2004 Russell et al.
2004/0048570 A1 3/2004 Oba et al.
2004/0048609 A1 3/2004 Kosaka
2004/0049687 A1 3/2004 Orsini et al.
2004/0059682 A1 3/2004 Hasumi et al.
2004/0059912 A1 3/2004 Zizzi
2004/0064728 A1 4/2004 Scheurich
2004/0068656 A1 4/2004 Lu
2004/0073792 A1 4/2004 Noble et al.
2004/0077313 A1 4/2004 Oba et al.
2004/0081127 A1 4/2004 Gardner et al.
2004/0082385 A1 4/2004 Silva et al.

(56) References Cited

U.S. PATENT DOCUMENTS

2004/0088558 A1 5/2004 Candelore
2004/0090345 A1 5/2004 Hitt
2004/0092231 A1 5/2004 Ayatsuka et al.
2004/0095911 A1 5/2004 Benveniste
2004/0098597 A1 5/2004 Giobbi
2004/0103061 A1 5/2004 Wood et al.
2004/0103062 A1 5/2004 Wood et al.
2004/0103064 A1 5/2004 Howard et al.
2004/0107169 A1 6/2004 Lowe
2004/0114563 A1 6/2004 Shvodian
2004/0117644 A1 6/2004 Colvin
2004/0123106 A1 6/2004 D'Angelo et al.
2004/0123107 A1 6/2004 Miyazaki et al.
2004/0123127 A1 6/2004 Teicher et al.
2004/0124966 A1 7/2004 Forrest
2004/0127277 A1 7/2004 Walker et al.
2004/0128162 A1 7/2004 Schlotterbeck et al.
2004/0128389 A1 7/2004 Kopchik
2004/0128500 A1 7/2004 Cihula et al.
2004/0128508 A1 7/2004 Wheeler et al.
2004/0128519 A1 7/2004 Klinger et al.
2004/0129787 A1 7/2004 Saito et al.
2004/0132432 A1 7/2004 Moores et al.
2004/0137912 A1 7/2004 Lin
2004/0153344 A1 8/2004 Bui et al.
2004/0153649 A1 8/2004 Rhoads et al.
2004/0158746 A1 8/2004 Hu et al.
2004/0166875 A1 8/2004 Jenkins et al.
2004/0167465 A1 8/2004 Mihai et al.
2004/0176032 A1 9/2004 Kotola et al.
2004/0181695 A1 9/2004 Walker
2004/0186768 A1 9/2004 Wakim et al.
2004/0193925 A1 9/2004 Safriel
2004/0194133 A1 9/2004 Ikeda et al.
2004/0201755 A1 10/2004 Norskog
2004/0203566 A1 10/2004 Leung
2004/0203885 A1 10/2004 Quaid
2004/0203923 A1 10/2004 Mullen
2004/0208139 A1 10/2004 Iwamura
2004/0209690 A1 10/2004 Bruzzese et al.
2004/0209692 A1 10/2004 Schober et al.
2004/0214582 A1 10/2004 Lan et al.
2004/0215615 A1 10/2004 Larsson et al.
2004/0217859 A1 11/2004 Pucci et al.
2004/0218581 A1 11/2004 Cattaneo
2004/0222877 A1 11/2004 Teramura et al.
2004/0230488 A1 11/2004 Beenau et al.
2004/0230809 A1 11/2004 Lowensohn et al.
2004/0234117 A1 11/2004 Tibor
2004/0238621 A1 12/2004 Beenau et al.
2004/0243519 A1 12/2004 Perttila et al.
2004/0246103 A1 12/2004 Zukowski
2004/0246934 A1 12/2004 Kim
2004/0246950 A1 12/2004 Parker et al.
2004/0250037 A1 12/2004 Takemura et al.
2004/0250074 A1 12/2004 Kilian-Kehr
2004/0252012 A1 12/2004 Beenau et al.
2004/0252659 A1 12/2004 Yun et al.
2004/0253996 A1 12/2004 Chen et al.
2004/0254837 A1 12/2004 Roshkoff
2004/0255139 A1 12/2004 Giobbi
2004/0255145 A1 12/2004 Chow
2004/0262384 A1 12/2004 Nishida et al.
2005/0001028 A1 1/2005 Zuili
2005/0001720 A1 1/2005 Mason et al.
2005/0002028 A1 1/2005 Kasapi et al.
2005/0005136 A1 1/2005 Chen et al.
2005/0006452 A1 1/2005 Aupperle et al.
2005/0009517 A1 1/2005 Maes
2005/0020322 A1 1/2005 Ruuska et al.
2005/0021369 A1 1/2005 Cohen et al.
2005/0021561 A1 1/2005 Noonan
2005/0023345 A1 2/2005 Furuyama et al.
2005/0025093 A1 2/2005 Yun et al.
2005/0028168 A1 2/2005 Marcjan
2005/0033689 A1 2/2005 Bonalle et al.
2005/0033703 A1 2/2005 Holdsworth
2005/0035897 A1 2/2005 Perl et al.
2005/0039027 A1 2/2005 Shapiro
2005/0040961 A1 2/2005 Tuttle
2005/0040968 A1 2/2005 Damarla et al.
2005/0044372 A1 2/2005 Aull et al.
2005/0044387 A1 2/2005 Ozolins
2005/0047386 A1 3/2005 Yi
2005/0049013 A1 3/2005 Chang et al.
2005/0050208 A1 3/2005 Chatani
2005/0050324 A1 3/2005 Corbett et al.
2005/0050367 A1 3/2005 Burger et al.
2005/0054431 A1 3/2005 Walker et al.
2005/0055242 A1 3/2005 Bello et al.
2005/0055244 A1 3/2005 Mullan et al.
2005/0058292 A1 3/2005 Diorio et al.
2005/0074126 A1 4/2005 Stanko
2005/0076242 A1 4/2005 Breuer
2005/0080973 A1 4/2005 Lee
2005/0081040 A1 4/2005 Johnson et al.
2005/0084137 A1 4/2005 Kim et al.
2005/0085259 A1 4/2005 Conner et al.
2005/0086115 A1 4/2005 Pearson
2005/0086497 A1 4/2005 Nakayama
2005/0086501 A1 4/2005 Woo et al.
2005/0086515 A1 4/2005 Paris
2005/0089000 A1 4/2005 Bae et al.
2005/0090200 A1 4/2005 Karaoguz et al.
2005/0091338 A1 4/2005 De La Huerga
2005/0091553 A1 4/2005 Chien et al.
2005/0094657 A1 5/2005 Sung et al.
2005/0096053 A1 5/2005 Liu et al.
2005/0097037 A1 5/2005 Tibor
2005/0099824 A1 5/2005 Dowling et al.
2005/0105600 A1 5/2005 Culum et al.
2005/0105734 A1 5/2005 Buer et al.
2005/0107965 A1 5/2005 Kerr et al.
2005/0108164 A1 5/2005 Salafia et al.
2005/0109836 A1 5/2005 Ben-Aissa
2005/0109841 A1 5/2005 Ryan et al.
2005/0113070 A1 5/2005 Okabe
2005/0113102 A1 5/2005 Kwon et al.
2005/0114149 A1 5/2005 Rodriguez et al.
2005/0114150 A1 5/2005 Franklin
2005/0114654 A1 5/2005 Brackett et al.
2005/0116020 A1 6/2005 Smolucha et al.
2005/0116050 A1 6/2005 Jei et al.
2005/0117530 A1 6/2005 Abraham et al.
2005/0119979 A1 6/2005 Murashita et al.
2005/0124294 A1 6/2005 Wentink
2005/0125258 A1 6/2005 Yellin et al.
2005/0128083 A1 6/2005 Puzio et al.
2005/0136947 A1 6/2005 Llombart-Juan et al.
2005/0137827 A1 6/2005 Takamiya
2005/0137977 A1 6/2005 Wankmueller
2005/0138390 A1 6/2005 Adams et al.
2005/0138576 A1 6/2005 Baumert et al.
2005/0139656 A1 6/2005 Arnouse
2005/0141451 A1 6/2005 Yoon et al.
2005/0149358 A1 7/2005 Sacco et al.
2005/0151623 A1 7/2005 von Hoffmann
2005/0152394 A1 7/2005 Cho
2005/0154897 A1 7/2005 Holloway et al.
2005/0161503 A1 7/2005 Remery et al.
2005/0165684 A1 7/2005 Jensen et al.
2005/0166063 A1 7/2005 Huang
2005/0167482 A1 8/2005 Ramachandran et al.
2005/0169292 A1 8/2005 Young
2005/0177716 A1 8/2005 Ginter et al.
2005/0180385 A1 8/2005 Jeong et al.
2005/0181875 A1 8/2005 Hoehne et al.
2005/0182661 A1 8/2005 Allard et al.
2005/0182975 A1 8/2005 Guo et al.
2005/0187368 A1 8/2005 Ebling et al.
2005/0187792 A1 8/2005 Harper
2005/0192748 A1 9/2005 Andric et al.
2005/0195975 A1 9/2005 Kawakita
2005/0198208 A1 9/2005 Nystrom

(56) References Cited

U.S. PATENT DOCUMENTS

2005/0200453 A1 9/2005 Turner et al.
2005/0201345 A1 9/2005 Williamson
2005/0201389 A1 9/2005 Shimanuki et al.
2005/0203682 A1 9/2005 Omino et al.
2005/0203844 A1 9/2005 Ferguson et al.
2005/0210270 A1 9/2005 Rohatgi et al.
2005/0212657 A1 9/2005 Simon
2005/0215233 A1 9/2005 Perera et al.
2005/0216313 A1 9/2005 Claud et al.
2005/0216639 A1 9/2005 Sparer et al.
2005/0218215 A1 10/2005 Lauden
2005/0220046 A1 10/2005 Falck et al.
2005/0221869 A1 10/2005 Liu et al.
2005/0224573 A1 10/2005 Yoshizane et al.
2005/0229007 A1 10/2005 Bolle et al.
2005/0229240 A1 10/2005 Nanba
2005/0231328 A1 10/2005 Castle et al.
2005/0235364 A1 10/2005 Wilson
2005/0242921 A1 11/2005 Zimmerman et al.
2005/0243787 A1 11/2005 Hong et al.
2005/0246416 A1 11/2005 Blomquist
2005/0249385 A1 11/2005 Kondo et al.
2005/0251688 A1 11/2005 Nanavati et al.
2005/0253683 A1 11/2005 Lowe
2005/0256878 A1 11/2005 Brown et al.
2005/0257072 A1* 11/2005 Cross ...................... H04L 63/08 713/193
2005/0257102 A1 11/2005 Moyer et al.
2005/0258229 A1 11/2005 Minemura
2005/0264416 A1 12/2005 Maurer
2005/0265371 A1 12/2005 Sharma et al.
2005/0268111 A1 12/2005 Markham
2005/0269401 A1* 12/2005 Spitzer .................. G07F 7/0886 235/380
2005/0272403 A1 12/2005 Ryu et al.
2005/0277385 A1 12/2005 Daum
2005/0278547 A1 12/2005 Hyndman et al.
2005/0281215 A1 12/2005 Budampati et al.
2005/0281320 A1 12/2005 Neugebauer
2005/0282558 A1 12/2005 Choi et al.
2005/0284932 A1 12/2005 Sukeda et al.
2005/0287985 A1 12/2005 Balfanz et al.
2005/0288015 A1 12/2005 Azizi et al.
2005/0288069 A1 12/2005 Arunan et al.
2005/0289473 A1 12/2005 Gustafson et al.
2006/0001525 A1 1/2006 Nitzan et al.
2006/0002349 A1 1/2006 Demirhan
2006/0005035 A1 1/2006 Coughlin
2006/0009216 A1 1/2006 Welnick et al.
2006/0014430 A1 1/2006 Liang et al.
2006/0022042 A1 2/2006 Smets et al.
2006/0022046 A1 2/2006 Iwamura
2006/0022800 A1 2/2006 Krishna et al.
2006/0025180 A1 2/2006 Rajkotia et al.
2006/0026338 A1 2/2006 Ebara et al.
2006/0026673 A1 2/2006 Tsuchida
2006/0030279 A1 2/2006 Leabman
2006/0030353 A1 2/2006 Jun
2006/0034250 A1 2/2006 Kim et al.
2006/0034492 A1 2/2006 Siegel et al.
2006/0041746 A1 2/2006 Kirkup et al.
2006/0046664 A1 3/2006 Paradiso et al.
2006/0050742 A1 3/2006 Grandhi et al.
2006/0053234 A1 3/2006 Kumar et al.
2006/0058102 A1 3/2006 Nguyen et al.
2006/0063575 A1 3/2006 Gatto et al.
2006/0064320 A1 3/2006 Postrel
2006/0064605 A1 3/2006 Giobbi
2006/0065730 A1 3/2006 Quan et al.
2006/0066441 A1 3/2006 Knadle et al.
2006/0069814 A1 3/2006 Abraham et al.
2006/0072586 A1 4/2006 Callaway et al.
2006/0074713 A1 4/2006 Conry et al.
2006/0075230 A1 4/2006 Baird et al.
2006/0075255 A1 4/2006 Duffy et al.
2006/0076401 A1 4/2006 Frerking
2006/0078176 A1 4/2006 Abiko et al.
2006/0080549 A1 4/2006 Okamura et al.
2006/0087407 A1 4/2006 Stewart et al.
2006/0089138 A1 4/2006 Smith et al.
2006/0095369 A1 5/2006 Hofi
2006/0095792 A1* 5/2006 Hurtado .................. G06F 21/10 713/189
2006/0097882 A1 5/2006 Brinkerhoff et al.
2006/0097949 A1 5/2006 Luebke et al.
2006/0101506 A1 5/2006 Gallo et al.
2006/0106645 A1 5/2006 Bergelson et al.
2006/0110012 A1 5/2006 Ritter
2006/0111941 A1 5/2006 Blom
2006/0111955 A1 5/2006 Winter et al.
2006/0112423 A1 5/2006 Villadiego et al.
2006/0113381 A1 6/2006 Hochstein et al.
2006/0116935 A1 6/2006 Evans
2006/0117013 A1 6/2006 Wada
2006/0120287 A1 6/2006 Foti et al.
2006/0129838 A1 6/2006 Chen et al.
2006/0136728 A1 6/2006 Gentry et al.
2006/0136742 A1 6/2006 Giobbi
2006/0136997 A1 6/2006 Telek et al.
2006/0143441 A1 6/2006 Giobbi
2006/0144943 A1 7/2006 Kim
2006/0156027 A1 7/2006 Blake
2006/0158308 A1 7/2006 Mcmullen et al.
2006/0163349 A1 7/2006 Neugebauer
2006/0163350 A1 7/2006 Melton et al.
2006/0165060 A1 7/2006 Dua
2006/0169771 A1 8/2006 Brookner
2006/0170530 A1 8/2006 Nwosu et al.
2006/0170565 A1 8/2006 Husak et al.
2006/0172700 A1 8/2006 Wu
2006/0173846 A1 8/2006 Omae et al.
2006/0173991 A1 8/2006 Piikivi
2006/0174349 A1 8/2006 Cronce et al.
2006/0183426 A1 8/2006 Graves et al.
2006/0183462 A1 8/2006 Kolehmainen
2006/0184531 A1 8/2006 Russlies
2006/0184795 A1 8/2006 Doradla et al.
2006/0185005 A1 8/2006 Graves et al.
2006/0187029 A1 8/2006 Thomas
2006/0190348 A1 8/2006 Ofer et al.
2006/0190413 A1 8/2006 Harper
2006/0194598 A1 8/2006 Kim et al.
2006/0195576 A1 8/2006 Rinne et al.
2006/0198337 A1 9/2006 Hoang et al.
2006/0200467 A1 9/2006 Ohmori et al.
2006/0205408 A1 9/2006 Nakagawa et al.
2006/0208066 A1 9/2006 Finn et al.
2006/0208853 A1 9/2006 Kung et al.
2006/0218196 A1 9/2006 Kurita
2006/0222042 A1 10/2006 Teramura et al.
2006/0226950 A1 10/2006 Kanou et al.
2006/0229909 A1 10/2006 Kaila et al.
2006/0236373 A1 10/2006 Graves et al.
2006/0237528 A1 10/2006 Bishop et al.
2006/0238305 A1 10/2006 Loving et al.
2006/0245620 A1 11/2006 Roques et al.
2006/0255935 A1 11/2006 Scalisi et al.
2006/0258289 A1 11/2006 Dua
2006/0268891 A1 11/2006 Heidari-Bateni et al.
2006/0273176 A1 12/2006 Audebert et al.
2006/0274711 A1 12/2006 Nelson et al.
2006/0279412 A1 12/2006 Holland et al.
2006/0286969 A1 12/2006 Talmor et al.
2006/0287763 A1 12/2006 Ochi et al.
2006/0288095 A1 12/2006 Torok et al.
2006/0288233 A1 12/2006 Kozlay
2006/0290473 A1 12/2006 Mahasenan et al.
2006/0290519 A1 12/2006 Boate et al.
2006/0290580 A1 12/2006 Noro et al.
2006/0292986 A1 12/2006 Bitran et al.
2006/0293925 A1 12/2006 Flom
2006/0294388 A1 12/2006 Abraham et al.
2007/0003111 A1 1/2007 Awatsu et al.
2007/0005403 A1 1/2007 Kennedy et al.

(56) References Cited

U.S. PATENT DOCUMENTS

2007/0006298 A1 1/2007 Malone et al.
2007/0007331 A1 1/2007 Jasper et al.
2007/0008070 A1 1/2007 Friedrich
2007/0008916 A1 1/2007 Haugli et al.
2007/0011724 A1 1/2007 Gonzalez et al.
2007/0016637 A1 1/2007 Brawn et al.
2007/0016800 A1 1/2007 Spottswood et al.
2007/0019845 A1 1/2007 Kato
2007/0029381 A1 2/2007 Braiman
2007/0032225 A1 2/2007 Konicek et al.
2007/0032288 A1 2/2007 Nelson et al.
2007/0033072 A1 2/2007 Bildirici
2007/0033150 A1 2/2007 Nwosu
2007/0035381 A1 2/2007 Davis
2007/0035397 A1 2/2007 Patenaude et al.
2007/0036396 A1 2/2007 Sugita et al.
2007/0038751 A1 2/2007 Jorgensen
2007/0039041 A1 2/2007 Davis
2007/0043594 A1 2/2007 Lavergne
2007/0050259 A1 3/2007 Wesley
2007/0050398 A1 3/2007 Mochizuki
2007/0050845 A1 3/2007 Das et al.
2007/0051794 A1 3/2007 Glanz et al.
2007/0051798 A1 3/2007 Kawai et al.
2007/0055630 A1 3/2007 Gauthier et al.
2007/0060095 A1 3/2007 Subrahmanya et al.
2007/0060319 A1 3/2007 Block et al.
2007/0061041 A1 3/2007 Zweig
2007/0064742 A1 3/2007 Shvodian
2007/0069852 A1 3/2007 Mo et al.
2007/0070040 A1 3/2007 Chen et al.
2007/0072636 A1 3/2007 Worfolk et al.
2007/0073553 A1 3/2007 Flinn et al.
2007/0075135 A1 4/2007 Dettinger et al.
2007/0078761 A1* 4/2007 Kagan .................. G06Q 20/322 705/39
2007/0084523 A1 4/2007 Mclean et al.
2007/0084913 A1 4/2007 Weston
2007/0087682 A1 4/2007 DaCosta
2007/0087834 A1 4/2007 Moser et al.
2007/0090195 A1 4/2007 Kawamura et al.
2007/0094088 A1* 4/2007 Mastie ................... G06Q 20/20 705/24
2007/0100507 A1 5/2007 Simon
2007/0100939 A1 5/2007 Bagley et al.
2007/0109117 A1 5/2007 Heitzmann et al.
2007/0112676 A1 5/2007 Kontio et al.
2007/0118891 A1 5/2007 Buer
2007/0119923 A1* 5/2007 Garrison ............ G06Q 20/4014 235/380
2007/0120643 A1 5/2007 Lee
2007/0120651 A1 5/2007 Kobayashi et al.
2007/0120698 A1 5/2007 Turk et al.
2007/0130025 A1* 6/2007 Nakajima .............. G06Q 20/40 705/26.1
2007/0132586 A1 6/2007 Plocher et al.
2007/0133478 A1 6/2007 Armbruster et al.
2007/0136103 A1 6/2007 Kim et al.
2007/0136407 A1 6/2007 Rudelic
2007/0142032 A1 6/2007 Balsillie
2007/0143626 A1 6/2007 Okuda
2007/0147332 A1 6/2007 Lappetelainen et al.
2007/0152826 A1 7/2007 August et al.
2007/0156850 A1 7/2007 Corrion
2007/0157249 A1 7/2007 Cordray et al.
2007/0158411 A1 7/2007 Krieg, Jr.
2007/0159301 A1 7/2007 Hirt et al.
2007/0159994 A1 7/2007 Brown et al.
2007/0164847 A1 7/2007 Crawford et al.
2007/0169121 A1 7/2007 Hunt et al.
2007/0174809 A1 7/2007 Brown et al.
2007/0174868 A1* 7/2007 Hitaka ................... G06Q 20/40 725/62
2007/0176756 A1 8/2007 Friedrich
2007/0176778 A1 8/2007 Ando et al.
2007/0180047 A1 8/2007 Dong et al.
2007/0180207 A1 8/2007 Garfinkle
2007/0187266 A1 8/2007 Porter et al.
2007/0192601 A1 8/2007 Spain et al.
2007/0194882 A1 8/2007 Yokota et al.
2007/0197261 A1 8/2007 Humbel
2007/0198436 A1 8/2007 Weiss
2007/0198848 A1 8/2007 Bjorn
2007/0204078 A1 8/2007 Boccon-Gibod et al.
2007/0205860 A1 9/2007 Jones et al.
2007/0205861 A1 9/2007 Nair et al.
2007/0207750 A1 9/2007 Brown et al.
2007/0213048 A1 9/2007 Trauberg
2007/0213090 A1 9/2007 Holmberg
2007/0214492 A1 9/2007 Gopi et al.
2007/0218921 A1 9/2007 Lee et al.
2007/0219926 A1 9/2007 Korn
2007/0220272 A1 9/2007 Campisi et al.
2007/0223403 A1 9/2007 Furuskar et al.
2007/0229260 A1 10/2007 Braun et al.
2007/0229268 A1 10/2007 Swan et al.
2007/0236332 A1 10/2007 Quan et al.
2007/0245157 A1 10/2007 Giobbi et al.
2007/0245158 A1 10/2007 Giobbi et al.
2007/0247366 A1 10/2007 Smith et al.
2007/0250718 A1 10/2007 Lee et al.
2007/0250920 A1 10/2007 Lindsay
2007/0258626 A1 11/2007 Reiner
2007/0260883 A1 11/2007 Giobbi et al.
2007/0260888 A1 11/2007 Giobbi et al.
2007/0262134 A1* 11/2007 Humphrey ......... G06Q 20/4014 235/379
2007/0266257 A1 11/2007 Camaisa et al.
2007/0268130 A1 11/2007 Yee et al.
2007/0268862 A1 11/2007 Singh et al.
2007/0271194 A1 11/2007 Walker et al.
2007/0271433 A1 11/2007 Takemura
2007/0273517 A1 11/2007 Govind
2007/0277044 A1 11/2007 Graf et al.
2007/0279190 A1 12/2007 Lugt et al.
2007/0280509 A1 12/2007 Owen et al.
2007/0285212 A1 12/2007 Rotzoll
2007/0285238 A1 12/2007 Batra
2007/0287386 A1 12/2007 Agrawal et al.
2007/0288263 A1 12/2007 Rodgers
2007/0288752 A1 12/2007 Chan
2007/0293155 A1 12/2007 Liao et al.
2007/0294755 A1 12/2007 Dadhia et al.
2007/0296544 A1 12/2007 Beenau et al.
2007/0299782 A1 12/2007 Beenau et al.
2007/0300052 A1 12/2007 Jevans
2008/0001724 A1 1/2008 Soleimani et al.
2008/0001783 A1 1/2008 Cargonja et al.
2008/0005432 A1 1/2008 Kagawa
2008/0008359 A1 1/2008 Beenau et al.
2008/0011842 A1 1/2008 Curry et al.
2008/0012685 A1 1/2008 Friedrich et al.
2008/0012767 A1 1/2008 Caliri et al.
2008/0016004 A1 1/2008 Kurasaki et al.
2008/0019578 A1 1/2008 Saito et al.
2008/0028227 A1 1/2008 Sakurai
2008/0028453 A1 1/2008 Nguyen et al.
2008/0040609 A1 2/2008 Giobbi
2008/0046366 A1 2/2008 Bemmel et al.
2008/0046715 A1 2/2008 Balazs et al.
2008/0049700 A1 2/2008 Shah et al.
2008/0056544 A1 3/2008 Aikawa et al.
2008/0061941 A1 3/2008 Fischer et al.
2008/0065181 A1 3/2008 Stevenson
2008/0071577 A1 3/2008 Highley
2008/0072063 A1 3/2008 Takahashi et al.
2008/0077359 A1 3/2008 Ito
2008/0080022 A1 4/2008 Gogulapati
2008/0088475 A1 4/2008 Martin
2008/0090548 A1 4/2008 Ramalingam
2008/0094228 A1 4/2008 Welch et al.
2008/0095359 A1 4/2008 Schreyer et al.
2008/0107089 A1 5/2008 Larsson et al.

(56) References Cited

U.S. PATENT DOCUMENTS

2008/0109895 A1 5/2008 Janevski
2008/0111752 A1 5/2008 Lindackers et al.
2008/0114694 A1 5/2008 Hamdane et al.
2008/0125965 A1 5/2008 Carani et al.
2008/0127176 A1 5/2008 Lee et al.
2008/0127225 A1 5/2008 Mullis, et al.
2008/0129450 A1 6/2008 Riegebauer
2008/0129463 A1 6/2008 Tuttle
2008/0141361 A1 6/2008 Balfanz
2008/0142588 A1 6/2008 Blum
2008/0148351 A1 6/2008 Bhatia et al.
2008/0149705 A1 6/2008 Giobbi et al.
2008/0150678 A1 6/2008 Giobbi et al.
2008/0154727 A1 6/2008 Carlson
2008/0156866 A1 7/2008 McNeal
2008/0159599 A1 7/2008 Kajihara et al.
2008/0164997 A1 7/2008 Aritsuka et al.
2008/0169909 A1 7/2008 Park et al.
2008/0176713 A1 7/2008 Olivera et al.
2008/0180213 A1 7/2008 Flax
2008/0186166 A1 8/2008 Zhou et al.
2008/0188308 A1 8/2008 Shepherd et al.
2008/0195735 A1 8/2008 Hodges et al.
2008/0195863 A1 8/2008 Kennedy
2008/0201768 A1 8/2008 Koo et al.
2008/0203107 A1 8/2008 Conley et al.
2008/0208016 A1 8/2008 Hughes et al.
2008/0209571 A1 8/2008 Bhaskar et al.
2008/0211627 A1 9/2008 Shinzaki
2008/0214300 A1 9/2008 Williams et al.
2008/0218416 A1 9/2008 Handy et al.
2008/0222701 A1 9/2008 Saaranen et al.
2008/0223918 A1 9/2008 Williams et al.
2008/0228524 A1 9/2008 Brown
2008/0235144 A1 9/2008 Phillips
2008/0238625 A1 10/2008 Rofougaran et al.
2008/0246613 A1 10/2008 Linstrom et al.
2008/0250388 A1 10/2008 Meyer et al.
2008/0251579 A1 10/2008 Larsen
2008/0252419 A1 10/2008 Batchelor et al.
2008/0278325 A1 11/2008 Zimman et al.
2008/0278327 A1 11/2008 Nierenberg et al.
2008/0284597 A1 11/2008 Shah
2008/0289018 A1 11/2008 Kawaguchi
2008/0289030 A1 11/2008 Poplett
2008/0289032 A1 11/2008 Aoki et al.
2008/0303637 A1 12/2008 Gelbman et al.
2008/0303638 A1 12/2008 Nguyen et al.
2008/0306759 A1 12/2008 Ilkin et al.
2008/0313728 A1 12/2008 Pandrangi et al.
2008/0314971 A1 12/2008 Faith et al.
2008/0316002 A1 12/2008 Brunet et al.
2008/0316045 A1 12/2008 Sriharto et al.
2009/0002134 A1 1/2009 McAllister
2009/0006846 A1 1/2009 Rosenblatt
2009/0013191 A1 1/2009 Popowski
2009/0016573 A1 1/2009 Mcafee et al.
2009/0024584 A1 1/2009 Dharap et al.
2009/0033464 A1 2/2009 Friedrich
2009/0033485 A1 2/2009 Naeve et al.
2009/0036164 A1 2/2009 Rowley
2009/0040041 A1 2/2009 Janetis et al.
2009/0041309 A1 2/2009 Kim et al.
2009/0043253 A1 2/2009 Podaima
2009/0045916 A1 2/2009 Nitzan et al.
2009/0052389 A1 2/2009 Qin et al.
2009/0070146 A1 3/2009 Haider et al.
2009/0070219 A1 3/2009 D'Angelo et al.
2009/0075592 A1 3/2009 Nystrom et al.
2009/0076849 A1 3/2009 Diller
2009/0081996 A1 3/2009 Duggal et al.
2009/0085724 A1 4/2009 Naressi et al.
2009/0085748 A1 4/2009 Barnes et al.
2009/0094681 A1 4/2009 Sadler et al.
2009/0096580 A1 4/2009 Paananen
2009/0115609 A1 5/2009 Weaver
2009/0121890 A1 5/2009 Brown et al.
2009/0125401 A1 5/2009 Beenau et al.
2009/0138953 A1 5/2009 Lyon
2009/0140045 A1 6/2009 Evans
2009/0150762 A1 6/2009 Febonio et al.
2009/0157512 A1 6/2009 King
2009/0160646 A1 6/2009 Mackenzie et al.
2009/0165123 A1 6/2009 Giobbi
2009/0176566 A1 7/2009 Kelly
2009/0177495 A1 7/2009 Abousy et al.
2009/0182582 A1 7/2009 Hammon
2009/0195461 A1 8/2009 Hirt
2009/0199206 A1 8/2009 Finkenzeller et al.
2009/0200378 A1 8/2009 Doherty et al.
2009/0206992 A1 8/2009 Giobbi et al.
2009/0221301 A1 9/2009 Riley et al.
2009/0222908 A1 9/2009 Warren
2009/0232362 A1 9/2009 Otsubo et al.
2009/0237245 A1 9/2009 Brinton et al.
2009/0237253 A1 9/2009 Neuwirth
2009/0239667 A1 9/2009 Rowe et al.
2009/0253516 A1 10/2009 Hartmann et al.
2009/0254448 A1 10/2009 Giobbi
2009/0254971 A1 10/2009 Herz et al.
2009/0264712 A1 10/2009 Baldus et al.
2009/0307764 A1 12/2009 Isobe et al.
2009/0310514 A1 12/2009 Jeon et al.
2009/0313689 A1 12/2009 Nystroem et al.
2009/0319788 A1 12/2009 Zick et al.
2009/0320118 A1 12/2009 Mueller et al.
2009/0322510 A1 12/2009 Berger et al.
2009/0322566 A1 12/2009 Shirakawa
2009/0327102 A1 12/2009 Maniar et al.
2009/0328182 A1 12/2009 Malakapalli et al.
2010/0005526 A1 1/2010 Tsuji et al.
2010/0007498 A1 1/2010 Jackson
2010/0008545 A1 1/2010 Ueki et al.
2010/0022239 A1 1/2010 Anzai
2010/0022308 A1 1/2010 Hartmann et al.
2010/0023074 A1 1/2010 Powers et al.
2010/0037255 A1 2/2010 Sheehan et al.
2010/0039280 A1 2/2010 Holm et al.
2010/0062743 A1 3/2010 Jonsson
2010/0077214 A1 3/2010 Jogand-Coulomb et al.
2010/0088116 A1 4/2010 Eisenberg et al.
2010/0091987 A1 4/2010 Takahashi et al.
2010/0117794 A1 5/2010 Adams et al.
2010/0127067 A1 5/2010 Eisenberg et al.
2010/0134257 A1 6/2010 Puleston et al.
2010/0169442 A1 7/2010 Liu et al.
2010/0169964 A1 7/2010 Liu et al.
2010/0172567 A1 7/2010 Prokoski
2010/0174911 A1 7/2010 Isshiki
2010/0188226 A1 7/2010 Seder et al.
2010/0214100 A1 8/2010 Page
2010/0277283 A1 11/2010 Burkart et al.
2010/0277286 A1 11/2010 Burkart et al.
2010/0289644 A1 11/2010 Slavin et al.
2010/0291896 A1 11/2010 Corda
2010/0305843 A1 12/2010 Yan et al.
2010/0328033 A1 12/2010 Kamei
2010/0330958 A1 12/2010 Corda et al.
2011/0034160 A1 2/2011 Corda et al.
2011/0053605 A1 3/2011 Carpio et al.
2011/0072034 A1 3/2011 Sly et al.
2011/0072132 A1 3/2011 Shafer et al.
2011/0080264 A1 4/2011 Clare et al.
2011/0082735 A1 4/2011 Kannan et al.
2011/0085287 A1 4/2011 Ebrom et al.
2011/0091136 A1 4/2011 Danch et al.
2011/0105854 A1 5/2011 Kiani et al.
2011/0116358 A9 5/2011 Li et al.
2011/0121964 A1 5/2011 Bannard
2011/0126188 A1 5/2011 Bernstein et al.
2011/0145570 A1 6/2011 Gressel et al.
2011/0169668 A1 7/2011 Henriksson
2011/0181443 A1 7/2011 Gutierrez et al.
2011/0221568 A1 9/2011 Giobbi

(56) References Cited

U.S. PATENT DOCUMENTS

2011/0227740 A1 9/2011 Wohltjen
2011/0238517 A1 9/2011 Ramalingam et al.
2011/0246790 A1 10/2011 Koh et al.
2011/0266348 A1 11/2011 Denniston, Jr.
2011/0307599 A1 12/2011 Saretto et al.
2012/0016305 A1 1/2012 Jollota et al.
2012/0028609 A1 2/2012 Hruska
2012/0030006 A1 2/2012 Yoder et al.
2012/0069776 A1 3/2012 Caldwell et al.
2012/0086571 A1 4/2012 Scalisi et al.
2012/0161936 A1 6/2012 Yoon et al.
2012/0182123 A1 7/2012 Butler et al.
2012/0212322 A1 8/2012 Idsoee
2012/0226451 A1 9/2012 Bacot et al.
2012/0226565 A1 9/2012 Drozd
2012/0226907 A1 9/2012 Hohberger et al.
2012/0238287 A1 9/2012 Scherzer
2012/0278188 A1 11/2012 Attar et al.
2012/0300753 A1 11/2012 Brown et al.
2012/0310720 A1 12/2012 Balsan et al.
2013/0019295 A1 1/2013 Park et al.
2013/0019323 A1 1/2013 Arvidsson et al.
2013/0044111 A1 2/2013 Vangilder et al.
2013/0095762 A1 4/2013 Inagaki et al.
2013/0111543 A1 5/2013 Brown et al.
2013/0135082 A1 5/2013 Xian et al.
2013/0179201 A1 7/2013 Fuerstenberg et al.
2013/0219186 A1 8/2013 Giobbi et al.
2013/0276140 A1 10/2013 Coffing et al.
2013/0277425 A1 10/2013 Sharma et al.
2013/0297514 A1 11/2013 Giobbi
2013/0312082 A1 11/2013 Izu et al.
2013/0315210 A1 11/2013 Brown et al.
2013/0331063 A1 12/2013 Cormier et al.
2014/0074696 A1 3/2014 Glaser
2014/0085479 A1 3/2014 Haas et al.
2014/0147018 A1 5/2014 Argue et al.
2014/0207686 A1 7/2014 Experton
2014/0256511 A1 9/2014 Smith
2014/0266604 A1 9/2014 Masood et al.
2014/0266713 A1 9/2014 Sehgal et al.
2014/0337920 A1 11/2014 Giobbi
2015/0026480 A1 1/2015 Giobbi et al.
2015/0039451 A1 2/2015 Bonfiglio
2015/0138330 A1 5/2015 Krishnamoorthi
2015/0294293 A1 10/2015 Signarsson
2015/0301155 A1 10/2015 Roisen et al.
2015/0310385 A1 10/2015 King et al.
2015/0310440 A1 10/2015 Hynes et al.
2016/0005020 A1 1/2016 Fernando et al.
2016/0027138 A1 1/2016 Larsen
2016/0093081 A1 3/2016 Kim et al.
2016/0133123 A1 5/2016 Giobbi et al.
2016/0171200 A1 6/2016 Giobbi
2016/0203349 A1 7/2016 Giobbi
2016/0205682 A1 7/2016 Brown et al.
2016/0210614 A1 7/2016 Hall
2016/0300236 A1 10/2016 Wiley et al.
2016/0306956 A1 10/2016 Giobbi
2017/0041315 A1 2/2017 Giobbi
2017/0085564 A1 3/2017 Giobbi et al.
2017/0091548 A1 3/2017 Agrawal et al.
2017/0221327 A1 8/2017 Wu et al.
2017/0270738 A1 9/2017 Giobbi
2017/0309165 A1 10/2017 Brown et al.
2017/0353500 A1 12/2017 Jacobsen et al.
2018/0019998 A1 1/2018 Giobbi
2018/0129799 A1 5/2018 Giobbi
2018/0322718 A1 11/2018 Qian et al.
2018/0357475 A1 12/2018 Honda et al.
2019/0065721 A1 2/2019 Giobbi
2019/0087612 A1 3/2019 Sengstaken, Jr.
2019/0172281 A1 6/2019 Einberg et al.
2019/0260724 A1 8/2019 Hefetz et al.
2019/0289562 A1 9/2019 Brown
2020/0020216 A1 1/2020 Slavin et al.
2020/0351873 A1 11/2020 Brown et al.
2021/0099952 A1 4/2021 Sengupta et al.
2021/0219869 A1 7/2021 Ryu et al.
2021/0241592 A1 8/2021 Allen et al.
2022/0091420 A1 3/2022 Woods et al.
2022/0210643 A1 6/2022 Hynds et al.
2022/0240050 A1 7/2022 Christensen et al.
2025/0093521 A1 3/2025 Czarnecky et al.

FOREIGN PATENT DOCUMENTS

EP 1600885 A1 11/2005
EP 2937805 A1 10/2015
JP 10-049604 A 2/1998
KR 10-2007-0060937 A 6/2007
WO 90/06633 A1 6/1990
WO 99/56429 A1 11/1999
WO 00/62505 A1 10/2000
WO 01/22724 A1 3/2001
WO 01/35334 A1 5/2001
WO 01/48714 A1 7/2001
WO 01/75876 A1 10/2001
WO 01/77790 A1 10/2001
WO WO/2002/067009 8/2002
WO 2004/010774 A1 2/2004
WO 2004/038563 A2 5/2004
WO 2004/042563 A2 5/2004
WO 2005/031663 A2 4/2005
WO 2005/050450 A1 6/2005
WO 2005/086802 A2 9/2005
WO 2005/104584 A1 11/2005
WO 2007/008540 A2 1/2007
WO 2007/081947 A2 7/2007
WO 2007/087558 A2 8/2007

OTHER PUBLICATIONS

Noore, "Highly Robust Biometric Smart Card Design." IEEE Transactions on Consumer Electronics, vol. 46, No. 4, Nov. 2000, pp. 1059-1063.

Paget, "The Security Behind Secure Extranets," Enterprise Systems Journal, vol. 14, No. 12, Dec. 1999, 4 pgs.

Pash, "Automate proximity and location-based computer actions," Jun. 5, 2007, retrieved from http:/lifehacker.com/265822/automate-proximity-and-location+based-computer-actionson or before Oct. 11, 2011, 3 gs.

Pope et al., "Oasis Digital Signature Services: Digital Signing without the Headaches," IEEE Internet Computing, vol. 10, Sep./Oct. 2006, pp. 81-84.

Priyantha, "The Cricket Indoor Location System," Ph.D. thesis submitted to Department of Electrical Engineering and Computer Science, Massachusetts Institute of Technology, Jun. 2005, 199 pgs.

Rodriguez et al., "In-building location using Bluetooth," Proceedings of the International Workshop on Wireless Ad-Hoc Networks (IWWAN 2005), May 23-26, 2005, London, England, 7 pgs.

Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.

Sapsford, "E-Business: Sound Waves Could Help Ease Web-Fraud Woes," Wall Street Journal, Aug. 14, 2000, p. B1.

Schneier, Applied Cryptography, Second Edition: Protocols, Algorithms, and Source Doe in C, Jan. 1, 1996, John Wiley & Sons, Inc., 1027 pgs.

Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.

Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.

(56) References Cited

OTHER PUBLICATIONS

Smart Card Alliance, "Contactless Technology for Secure Physical Access: Technology and Standards Choices," Smart Card Alliance, Oct. 2002, pp. 1-48.
Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.
Srivastava, "Is internet security a major issue with respect to the slow acceptance rate of digital signatures," Jan. 2, 2005, Computer Law & Security Report, pp. 392-404.
Tadlys Ltd., "'Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.
Tadlys Ltd., "About Tadlys," at least as early as Apr. 5, 2001, 1 pg., archived at https://web.archive.org/web/20010405044249/http:/www.tadlys.com/about.html.
Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.
Tadlys Ltd., "First Demo of Distribution and Redemption of e-Coupons over Bluetooth," Tadlys Company News and Events, Jun. 5, 2001, 1 pg., archived at https://web.archive.org/web/20040601051516/http://tadlys.com/Pages/news_content.asp?iGlobalID=17.
Tadlys Ltd., "Operator Systems," at least as early as Nov. 1, 2004, 2 pgs., archived at https://web.archive.org/web/20041101101402/http://www.tadlys.com/media/downloads/operator_network.pdf.
Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGlobalID=16.
Tadlys Ltd., "Tadlys' Wire free networking solutions," Feb. 2001, 2 pgs., archived at https://web.archive.org/web/20010204012700/http:/www.tadlys.com/solutions.html.
Tadlys Ltd., "Wireless hospital network," at least as early as Jul. 1, 2004, 2 pgs., archived at https://web.archive.org/web/20040701105046/http://www.tadlys.com/media/downloads/ladlys_hospital_wireless_network.pdf.
Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.
Tadlys Ltd., "Corporate Systems," at least as early as Nov. 1, 2004, 2 pgs., archived at https://web.archive.org/web/20041101095441/http://www.tadlys.com/media/downloads/Corporate_network.pdf.
Thomson Multimedia, "Thomson multimedia unveils copy protection proposal designed to provide additional layer of digital content security," retrieved from www.thompson-multimedia.com/GB/06/c01/010530.htm on Mar. 4, 2002, May 30, 2001, 2 pgs.
Thongthammachart et al., "Bluetooth Enables In-door Mobile Location Services," Proceedings of the 57th IEEE Semiannual Vehicular Technology Conference, Apr. 22-25, 2003, 5 pgs.
University of Birmingham, "PRISM: Probabilistic Symbolic Model Checker," at least as early as Aug. 3, 2004, 3 pgs., archived at https://web.archive.org/web/20040803193058/http://www.cs.bham.ac.uk/~dxp/prism/casestudies/index.html.
Unixhelp, "What is a file?" Apr. 30, 1998, retrieved from unixhelp.ed.ac.uk/editors/whatisafile.html accessed Mar. 11, 2010 via http://waybackmachine.org/19980615000000*/http://unixhelp.ed.ac.uk/editors/whatisafile.html on Mar. 11, 2011, 1 pg.
Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
Weissman, "Indoor Location," Tadlys Ltd. white paper, at least as early as Oct. 31, 2004, 15 pgs., archived at https://web.archive.org/web/20041031125859/http:/www.tadlys.com/media/downloads/Indoors_Location_Systems.pdf.
White, "How computers Work," Millennium Edition, 1999, Que Corporation, Indianapolis, IN, all pages.
Yoshida, "Content Protection Plan Targets Wireless Home Networks," EE Times, Jan. 11, 2002, retrieved from www.eetimes.com/story/OEG20020111S0060 on Mar. 4, 2002, 2 pgs.
ZigBee Alliance, "Welcome to the ZigBeeTM Alliance," exemplary web page, at least as early as Sep. 24, 2004, 2 pgs., archived at https://web.archive.org/web/20040924045517/http://zigbee.org/.
ZigBee Alliance, "ZigBee Specification," ZigBee Document 053474r06, Version 1.0, Dec. 14, 2004, 378 pgs.
ZigBee Alliance, "The ZigBeeTM Buzz Is Growing: New Low-Power Wireless Standard Opens Powerful Possibilities," Electronic Design, Jan. 12, 2004, 12 pgs., archived at https://web.archive.org/web/20040411172015/http:/www.elecdesign.com/Files/29/7186/7186_01.pdf.
ZigBee Alliance, "ZigBeeTM Positioned to Drive Wireless Networking in Building Automation, Industrial and Residential Control and Sensors Markets in 2004," press release, Feb. 17, 2004, 3 pgs., archived at https://web.archive.org/web/20040423220244/http:/www.zigbee.org/documents/04036r5ZB_MWG-Momentum-Release_FINAL.pdf.
Agourare et al., "Authentication and location control via RFID analysis," 2009 IEEE Conference on Emerging Technologies & Factory Automation, Sep. 1, 2009, 8 pgs.
Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.
Petition for Inter Partes Review of U.S. Pat. No. 10,698,989, Aug. 26, 2021, 3356 pgs.
Petition for Inter Partes Review of U.S. Pat. No. 8,352,730, Aug. 26, 2021, 2450 pgs.
Petition for Inter Partes Review of U.S. Pat. No. 9,298,905, Aug. 26, 2021, 1941 pgs.
Anonymous, "BluePayz: A Seamless Payment Method Using Bluetooth-Enabled Mobile Phones," IP.com Publication Date 2003-Jun. 20, 2003, https://priorart.ip.com/1 PCOM/000015495 (Year: 2003).
Feng Bao, et al., "Design of portable mobile devices based e-payment system and e-ticketing system with digital signature," 2001 International Conferences on Info-Tech and Info-Net. Proceedings (Cat. No.01 EX479), Beijing, China, 2001, pp. 7-12 vol.6, doi: 10.1109/ICII.2001.982996. (Year: 2001).
Y. Labrou, J. Agre, L. Ji, J. Molina and W .. -1. Chen, "Wireless wallet," The First Annual International Conference on Mobile and Ubiquitous Systems: Networking and Services, 2004. Mobiquitous 2004., Boston, MA, USA, 2004, pp. 32-41, doi: 10.1109/MOBIQ.2004.1331708. (Year: 2004).
David et al., Security Issues for Contactless Smart Cards, Sep. 1, 1997, conference paper, available online at https://link.springer.com/chapter/10.1007/BFb0054029, 6 pgs.
Kuhn et al., Introduction to Public Key Technology and the Federal PKI Infrastructure, Feb. 26, 2001, National Institute of Standards and Technology, 54 pgs.
Petition for Inter Partes Review of U.S. Pat. No. 9,049,188, Aug 26, 2021, 800 pgs.
Petition for Inter Partes Review of U.S. Pat. No. 9,235,700, Aug. 26, 2021, 466 pgs.
Request for Ex Parte Reexamination of U.S. Pat. No. 10,698,989, Jun. 8, 2022, 1505 pgs.
Request for Ex Parte Reexamination of U.S. Pat. No. 8,352,730, Jun. 8, 2022, 1401 pgs.
Request for Ex Parte Reexamination of U.S. Pat. No. 9,298,905, Jun. 8, 2022, 1123 pgs.

(56) References Cited

OTHER PUBLICATIONS

Smart Card Alliance, Contactless Payment and the Retail Point of Sale: Applications, Technologies and Transaction Models, Mar. 1, 2003, a Smart Card Alliance Report, 50 pgs.
Smart Card Alliance, Smart Card Alliance—The Alliance, Jan. 22, 2001, http://www.smartcardalliance.org, 1 pg.
NPL Search Terms (Year: 2023).
Serrao et al., "Protecting Digital Music Delivery and Consumption using the OCCAMM Project Framework," Proceedings of the Second International Conference on Web Delivering of Music, 2002, pp. 38-45, doi: 10.1109/WDM.2002.1176192.
Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http:/www.freescale.com/webapp/sps/site/overview.jsp?nodeId=02XPgQ6988.
Freescale Semiconductor, Inc., "ZigBee Alliance Successfully Concludes First Multi-node Network Test," press release, Jul. 6, 2004, 2 pgs., archived at https://web.archive.org/web/20040717113733/http:/www.zigbee.org/documents/First-Multi-Node_Testing_FINAL_000.pdf.
Freescale Semiconductor, Inc., "ZigBeeTM Technology from Freescale," Freescale Semiconductor, Inc. white paper, 2004, 4 pgs., archived at https://web.archive.org/web/20050513024652/http:/www.freescale.com/files/wireless_comm/doc/brochure/BRZIGBEETECH.pdf.
Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1&nodeId=02XPgQhCQ6m6cy7103.
Freescale Semiconductor, Inc., M68HC08 microcontroller ordering web page, at least as early as Aug. 17, 2004, 5 pgs., archived at https://web.archive.org/web/20040817014804/http:/www.freescale.com/webapp/sps/site/taxonomy.jsp?nodeId=01624684498634.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet works," Millennium Edition, 1999, Que Corporation, Indianapolis, IN, all pages.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
Hester et al., "neuRFon(TM) Netform: A Self-Organizing Wireless Sensor Network", Oct. 14, 2002, Proceedings of the Eleventh International Conference on Computer Communications and Networks, pp. 364-369.
Honkanen et al., "Low End Extension for Bluetooth", Sep. 19, 2004, Proceedings of the 2004 IEEE Radio and Wireless Conference, Atlanta, GA, pp. 199-202.
IBM Corporation, "Tadlys' Bluetooth Wireless Local Network for Corporate," Wireless e-business, at least as early as May 6, 2004, 2 pgs., archived at https://web.archive.org/web/20040621130525/http://www.tadlys.com/media/downloads/Corporate%20PVDEE01005-3.pdf.
IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.
IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.
IEEE, "IEEE 802.15 WPANTM Task Group 4 (TG4)" exemplary web page, Aug. 24, 2004, 2 pgs., archived at https://web.archive.org/web/20040824085452/http:/www.ieee802.org/15/pub/TG4.html.
International Search Report and Written Opinion for International Application No. PCT/US04/38124, mailed Apr. 7, 2005, 10 pgs.
International Search Report and Written Opinion for International Application No. PCT/US05/00349, mailed Mar. 19, 2008, 10 pgs.
International Search Report and Written Opinion for International Application No. PCT/US05/07535, mailed Dec. 6, 2005, 6 pgs.
International Search Report and Written Opinion for International Application No. PCT/US05/43447, mailed Feb. 22, 2007, 7 pgs.
International Search Report and Written Opinion for International Application No. PCT/US05/46843, mailed Mar. 1, 2007, 10 pgs.
International Search Report and Written Opinion for International Application No. PCT/US07/11102, mailed Oct. 3, 2008, 11 pgs.
International Search Report and Written Opinion for International Application No. PCT/US07/11103, mailed Apr. 23, 2008, 9 pgs.
International Search Report and Written Opinion for International Application No. PCT/US07/11104, mailed Jun. 26, 2008, 9 pgs.
International Search Report and Written Opinion for International Application No. PCT/US07/11105, mailed Oct. 20, 2008, 10 pgs.
International Search Report and Written Opinion for International Application No. PCT/US08/83060, mailed Dec. 29, 2008, 9 pgs.
International Search Report and Written Opinion for International Application No. PCT/US08/87835, mailed Feb. 11, 2009, 8 pgs.
International Search Report and Written Opinion for International Application No. PCT/US09/34095, mailed Mar. 25, 2009, 11 pgs.
International Search Report and Written Opinion for International Application No. PCT/US2009/039943, mailed Jun. 1, 2009, 9 pgs.
International Search Report and Written Opinion for International Application No. PCT/US2014/037609, mailed Dec. 9, 2014, 13 pgs.
International Search Report for International Application No. PCT/US2001/049916, mailed on Apr. 25, 2002, 1 pg.
Jeyaprakash et al., "Secured Smart Card Using Palm Vein Biometric On-Card-Process," 2008 International Conference on Convergence and Hybrid Information Technology, 2008, pp. 548-551.
Jonker et al., "Digital rights management in consumer electronics products," IEEE Signal Processing Magazine, vol. 21, No. 2, pp. 82-91, Mar. 2004, doi: 10.1109/MSP.2004.1276116.
Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," www.informationweek.com, Jun. 7, 2001, 1 pg.
Korzeniowski, "First Intelligent, Wireless Consumer Devices About to Hit Market," TechNewsWorld, Jul. 28, 2004, 3 pgs., archived at https://web.archive.org/web/20040821061130/http:/www.technewsworld.com/story/35376.html%20com/.
Lake, "Downloading for Dollars: Who said buying music off the Net would be easy?" Sound & Vision, Nov. 2000, pp. 137-138.
Lee et al., "Effects of dielectric superstrates on a two-layer electromagnetically coupled patch antenna," Digest on Antennas and Propagation Society International Symposium, 1989, pp. 620-623 vol. 2, doi: 10.1109/APS.1989.134763.
Lewis, "Sony and Visa in On-Line Entertainment Venture," New York Times, vol. 145, Thurs. Ed., Nov. 16, 1995, 1 pg.
Liu et al., "A Practical Guide to Biometric Security Technology," IT Pro, vol. 3, No. 1, Jan./Feb. 2001, pp. 27-32.
Machine translation of JPH10049604, 27 pages.
Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.
McIver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.
Micronas, "Micronas and Thomson Multimedia Showcase a New Copy Protection System that Will Drive the Future of Digital Television," www.micronas.com: Jan. 8, 2002, 3 pgs.

(56) References Cited

OTHER PUBLICATIONS

MIT Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
MIT Computer Science and Artificial Intelligence Laboratory, "The Cricket Indoor Location System," at least as early as Nov. 19, 2004, 6 pgs., archived at https://web.archive.org/web/20041119183049/http://cricket.csail.mit.edu/.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http:/www.motorola.com/mediacenter/news/detail/0,1958,2743_2228_23,00.html.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdfffiles1/nij/185030b.pdf, retrieved from http://web.archive.erg/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vitiles, "magicJack: Could It Be the Asterisk Killer?" Aug. 1, 2007, retrieved from http://nerdvittles.com/index.php?p=187 on or before Oct. 11, 2011, 2 pgs.
Adams, "Designing with 802.15.4 and Zigbee," presented at Industrial Wireless Applications Summit, San Diego, California, Mar. 9, 2004, 22 pgs.
Adams, "Meet the ZigBee Standard," Sensors Online, Jun. 2003, 7 pgs., archived at https://web.archive.org/web/20031008191032/http:/sensorsmag.com/articles/0603/14/pf_main.shtml.
Adams, "Zigbee vital in industrial applications," EE Times, Jul. 29, 2003, 3 pgs., archived at https://web.archive.org/web/20031013062940/http:/www.eetimes.com/story/OEG20030727S0002.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8cO on Jan. 7, 2007, 5 pgs.
Anonymous, "Firecrest Shows How Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
Biopay, LLC, "Frequently Asked Questions (FAQs) About BioPay," retrieved from http://www.biopay.com/faqs-lowes.asp on Jan. 7, 2007, 5 pgs.
Blip Systems, "Mar. 8, 2004—Bluetooth at the office?" at least as early as Oct. 11, 2004, archived at https://web.archive.org/web/20041011094320/http:/www.blipsystems.com/Default.asp?ID=16&M=News&PID=25&NewsID=9.
Blip Systems, "BlipManager," at least as early as May 17, 2004, 1 pg., archived at https://web.archive.org/web/20040517050728/http:/www.blipsystems.com/Default.asp?ID=11.
Blip Systems, "BlipMobility," at least as early as Apr. 7, 2004, archived at https://web.archive.org/web/20040407212934/http:/www.blipsystems.com/Default.asp?ID=118.
Blip Systems, "BlipNet API," at least as early as May 18, 2004, 1 pg., archived at https://web.archive.org/web/20040518060132/http:/www.blipsystems.com/Default.asp?ID=92.
Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.
Blip Systems, "BlipNet Technical Overview," Mar. 2003, 30 pgs., archived at https://web.archive.org/web/20031012184406/http:/www.blipsystems.com/products_blipnet.shtml.
Blip Systems, "BlipNode," at least as early as May 16, 2004, 1 pg., archived at https://web.archive.org/web/20040516001554/http:/www.blipsystems.com/Default.asp?ID=10.
Blip Systems, "BlipServer," at least as early as May 17, 2004, 1 pg., archived at https://web.archive.org/web/20040517044955/http:/www.blipsystems.com/Default.asp?ID=9.
Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.
Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
BlueProximity, "BlueProximity—Leave it—it's locked, come back, it's back too . . . " Aug. 26, 2007, retrieved from http://blueproximity.sourceforge.net/viahttp://www.archive.org/ on or before Oct. 11, 2011, 1 pg.
Bluetooth Sig, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Bluetooth Sig, Inc., "Bluetooth," www.bluetooth.com, Jun. 1, 2000, 8 pgs.
Bluetooth Sig, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping_cart/products/product_detail.asp?sku=AU1823.
Callaway, Wireless Sensor Networks: Architectures and Protocols, Jan. 1, 2004, Auerbach Publications, 366 pgs.
Chen et al."On Enhancing Biometric Authentication with Data Protection." KES2000. Fourth International Conference on Knowledge-Based Intelligent Engineering Systems and Allied Technologies. Proceedings (Cat. No.00TH8516), vol. 1, Aug. 1, 2000, pp. 249-252.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (POE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fall 2017, pp. 5-21.

(56) References Cited

OTHER PUBLICATIONS

Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Disclosed Anonymously (Method and Apparatus for Mobile Identity Authentication)., An IP.com Prior Art Database Technical IP.com No. IPCOM000194545D., IP.com Electronic Publication Date: Mar. 29, 2010 (Year: 2010).
Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632, 16 pgs., https://doi.org/10.1007/s10009-006-0014-x.
Dvorak, IEEE 802.15.4 and Zigbee Overview, Sep. 27, 2005, Motorola, 26 pgs.
Eshed, "Bluetooth Wireless Technology Application for the Retail Market," published at www.tadlys.com on May 2001, 8 pgs.
Farouk et al., "Authentication Mechanisms in Grid Computing Environment: Comparative Study," IEEE, Oct. 2012, p. 1-6.
Fasca, "S3, via Formalize Agreement," Electronic News, The Circuit, 45(45, Nov. 8, 1999), p. 20.
Freescale Semicondutor, Inc., "Freescale Events," see ZigBee Open House Event, Aug. 18, 2004, 6 pgs., archived at https://web.archive.org/web/20040909082726/https://www.freescale.com/webapp/sps/site/overview.jsp?nodeId=02XPgQ7JgbBqJQ#zigbee_openhouse_04.
Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp?nodeId=02XPgQhHPRjdyB37087725.
Freescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.
Freescale Semiconductor, Inc., "ZigBeeTM," Freescale Semiconductor Wireless Standards, at least as early as Jun. 11, 2004, 2 pgs., archived at https://web.archive.org/web/20040611051834/http:/e-www.motorola.com/webapp/sps/site/overview.jsp?nodeId=02XPgQhHPRjdyB.
Zhang et al., "A User-Centric M-Payment Solution," The ISG-Smart Card Centre and the Information Security Group, Royal Holloway, University of London, Egham, Surrey, TW20 0EX, UK, 2005, 8 pgs.
Anonymous, "BluePayz: A Seamless Payment Method Using Bluetooth-Enabled Mobile Phones," IP.com Publication Date 2003-Jun. 20, 2003, https://priorart.ip.eom/1 PCOM/000015495 (Year: 2003).
Beaufour, "Personal Servers as Digital Keys," Proceedings of the Second IEEE Annual Conference on Pervasive Computing and Communications (PERCQM'04), Mar. 14-17, 2004, pp. 319-328.
Blip Systems, BlipMobihty, at least as early as Apr. 7, 2004, archived at https://web. archive.org/web/20040407212934/http:/www. blipsystems.com/Default.asp?ID=1 18.
Chen et al."On Enhancing Biometric Authentication with Data Protection." KES2000. Fourth International Conference on Knowledge-Based Intelligent Engineering Systems and Allied Technologies. Proceedings (Cat. No. OOTH8516), vol. 1, Aug. 1, 2000, pp. 249-252.
Costa, "Imation USB 2.0 Micro Hard Drive," Nov. 22, 2005, retrieved from http://www.pcmag.eom/article2/0,2817,1892209,00.asp on or before Oct. 11, 2011, 2 pgs.
Dai et al., Toward Blockchain-Based Accounting and Assurance, Journal of Information Systems, vol. 31, No. 3, Fai 2017, pp. 5-21.
Lockton et al., RFID: The next serious threat to privacy, Ethics and Information Technology (2005) 7:221-231 (Year: 2006).
Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.
Reescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.
Rodriguez et al., "In-building location using Bluetooth," Proceedings of the International Workshop on Wreless Ad-Hoc Networks (IWWAN 2005), May 23-26, 2005, London, England, 7 pgs.
Schneier, Applied Cryptography, Second Edition: Protocols, Algorithms, and Source Doe in C, Jan. 1, 1996, John Wley & Sons, Inc., 1027 pgs.
Splashid, "SplashID—Secure Password Manager for PDA's and Smartphones," Mar. 8, 2007, retrieved from http://www.splashdata/com/splashid/via http://www.archive.org/on or before Oct. 11, 2011, 2 pgs.
Tadlys Ltd., "Bluetooth Glossary," at least as early as Jun. 2004, 12 pgs., archived at https://web. archive.org/web/20040531082349/http://www.tadlys.com/pages/Downloads_content.asp?intGlobalId=1.
Tadlys Ltd., "Indoor Location Networks," at least as early as Apr. 3, 2004, 1 pg., archived at https://web. archive.org/web/20040403200221/http:/www.tadlys.com/Pages/Product_content.asp?iGlobalId=2.
"How to find the serial number on TP-Link devices," https://www.tp-link.com/us/support/faq/503/ (last visited Apr. 15, 2024), 3 pgs.
Google Pixel Serial Number Guide, HomeServe webpage, https://www.homeserve.com/en-us/customers/find-serial-numberdevice-type/google/, 3 pgs.
NPL Search Terms (Year: 2024).
Product Identification Codes, https://www.uc.edu/content/dam/uc/ce/docs/OLLI/Page%20Content/PRODUCT%20IDENTIFICATION%20CODES%20BAR%20QR.pdf, last visited Apr. 19, 2024, 88 pgs.
Specification of the Bluetooth System, Wireless Connections Made Easy, v 1.0 B, Dec. 1, 1999, 440 pgs., Dec. 1, 1999.
UK IT Security Evaluation and Certification Scheme, UK IT Security Evaluation and Certification Scheme, Certification Report No. P165, Sony FeliCa Contactless Smart Card, Issue 1.0, Mar. 2002, 27 pgs., Mar. 1, 2002.
Machine generated English translation of JPH10049604 Shimadzu Corp.published Feb. 20, 1998. 33 pages, downloaded from Espacenet on Nov. 13, 2017.
"802.15.3b Part 15.3: Wireless Medium Access Control (MAC) and Physical Layer (PHY) Specifications for High Rate Wireless Personal Area Networks (WPANs)." IEEE-SA Standards Board, May 5, 2006.
"Get IEEE 802 Update." Nov. 9, 2018. 8 pgs.
"IEEE Standards Association." Terms of Use for IEEE Standards Publications Delivered in Electronic Form, IEEE, 2005, https://web.archive.org/web/20050529084555/standards.ieee.org:80/getieee802/download/.
"IEEE." "get IEEE 802"(Tm) Home Page, 2003, web.archive.org/web/20031008112815/standards.ieee.org:80/getieee802/.
"IEEE." Welcome to Standards Information Network, Jun. 3, 2004, web.archive.org/web/20040603154924/standards.ieee.org:80/standardspress/.
Cai, et al. "A Novel Design of IEEE 802.15.3 Mac over UWB." IEEE 60th Vehicular Technology Conference, 2004. VTC2004-Fall. 2004, vol. 7, pp. 5297-5301, doi: 10.1109/vetecf.2004.1405113.
Cooklev, Todor. "A Study of IEEE 802.11, 802.15, and 802.16." Wireless Communication Standards, Standards Information Network, IEEE Press, New York, NY, 2004, pp. 1-200.
Gilb, James P. K. "Draft Running Comment Resolution." IEEE P802.15 Working Group for Wireless Personal Area Networks (WPANs), Oct. 10, 2004, pp. 1-27.
Gilb, James P. K. Wireless Multimedia: A Guide to the IEEE 802.15.3 Standard. Standards Information Network, IEEE Press, 2004.

(56) References Cited

OTHER PUBLICATIONS

Guo, et al. “Intra-Superframe Power Management for IEEE 802. 15.3 WPAN.” IEEE Communications Letters, vol. 9, No. 3, Mar. 2005, pp. 228-230, doi: 10.1109/lcomm.2005.03023.

IEEE Computer Society, “IEEE Std 802.15.3—Part 15.3: Wireless Medium Access Control (MAC) and Physical Layer (PHY) Specifications for High Rate Wireless Personal Area Networks (WPANs),” The Institute of electrical and Electronics Engineers, Inc., New York, NY, Oct. 1, 2003, 324 pgs.

Petition for Inter Partes Review of U.S. Pat. No. 10,698,989, Mar. 18, 2025, 99 pgs.

Petition for Inter Partes Review of U.S. Pat. No. 8,219,129, Dec. 23, 2024, 102 pgs.

Petition for Inter Partes Review of U.S. Pat. No. 8,457,672, Dec. 23, 2024, 94 pgs.

Petition for Inter Partes Review of U.S. Pat. No. 9,049,188, Feb. 7, 2025, 84 pgs.

Petition for Inter Partes Review of U.S. Pat. No. 9,265,043, Dec. 23. 2024, 94 pgs.

Wang et al. “Comparison of IEEE 802.11e and IEEE 802.15.3 MAC,” 2004, pp. 675-680.

Zeng RanRan and Kuo, Geng-Sheng. “A Novel Scheduling Scheme and Mac Enhancements for IEEE 802.15.3 High-Rate Wpan.” IEEE Wireless Communications and Networking Conference, 2005, vol. 4, pp. 2478-2483, doi:10.1109/wcnc.2005.1424903.

KR-20070060937—machine translation (Year: 2007).

ADT. “Apps and Data to Go on USB Drives”, Jul. 2005. Retrieved from <https://adtmag.com/articles/2005/07/27/apps-and-data-to-go-on-usb-drives.aspx?p=1>. (Year: 2005).

Nadel, Brian. “SanDisk Cruzer Profile review: SanDisk Cruzer Profile”, Apr. 2005. Retrieved from <https://www.cnet.com/reviews/sandisk-cruzer-profile-review/>. (Year: 2005).

Sever, Gil. “Don’t get out-smarted by smart devices”, Aug. 2007. Retrieved from <https://www.scworld.com/perspective/dont-get-out-smarted-by-smart-devices>. (Year: 2007).

* cited by examiner

TWO-LEVEL AUTHENTICATION FOR SECURE TRANSACTIONS

CROSS REFERENCE TO RELATED APPLICATIONS

The present application is a continuation of U.S. patent application Ser. No. 15/973,089, titled "Two-Level Authentication for Secure Transactions," filed on May 7, 2018, which is a continuation of U.S. patent application Ser. No. 13/857,905, titled "Two-Level Authentication for Secure Transactions," filed on Apr. 5, 2013, which is a continuation of U.S. patent application Ser. No. 11/744,831, titled "Two-Level Authentication for Secure Transactions," filed on May 5, 2007, which claims the benefit of priority under 35 U.S.C. § 119(e) of U.S. Provisional Application No. 60/798,172, titled "Touch Pay," filed on May 5, 2006; U.S. Provisional Application No. 60/798,843, titled "Touch Pay," filed on May 8, 2006; U.S. Provisional Application No. 60/838,788, titled "Personal Digital Key Accessible Storage Device and Processor," filed on Aug. 17, 2006; U.S. Provisional Application No. 60/824,758, titled "Truprox Touch Technology," filed on Sep. 6, 2006; and U.S. Provisional Application No. 60/894,608, titled "TruProx Stored-Photo Extension," filed on Mar. 13, 2007, the entire contents of all of which are herein incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND

1. Field of Art

The invention generally relates to electronic authentication, and more specifically, to secure authentication using biometric verification.

2. Description of the Related Art

Optimizing sales transactions and providing secure access to physical and/or digital assets are challenges faced by many businesses and organizations. Ensuring these processes are safe, efficient and simple is important to merchants, providers, users and consumers alike. Conventionally, technologies such as magnetic cards (e.g., credit cards, debit cards, ATM cards, and employee badges) have been used in attempt to address these needs. More recently, various contactless cards or tokens requiring placement near compatible readers have been used.

Each of these technologies, however, has inherent problems in providing secure transaction processing and access control. In particular, the conventional technologies fail to sufficiently ensure that individuals attempting to perform a transaction are associated with the access device and are authorized to do so. Conventional attempts to address this issue include requiring users to provide Personal Identification Numbers (PINs) or passwords in conjunction with account numbers. While in some instances, these options have helped to combat fraudulent activity, these solutions add unwanted complexity and delay to transactions. With the growing need to memorize various PINs and passwords, individuals tend to repeatedly use the same, simple phrase to protect many items, or worse, keep the written phrases in their purse/wallet or next to their computer. Thus, the use of PINs and passwords are often defeated.

A technology better suited to address the issue of authenticating users is biometrics. In biometric authentication, physical and/or behavioral characteristics of an individual are analyzed to uniquely identify the individual. For example, biometric characteristics can include fingerprint, retinal, iris, face, palm, DNA, voice or signature characteristics that can each be uniquely associated with the individual. However, traditional biometric authentication solutions also suffer from significant problems. First, traditional biometric authentication techniques typically expose the participating parties to serious liabilities, risks and inefficiencies. Conventional biometric authentication techniques nearly always require users to release personal, private and unchangeable data to a controlling-entity (e.g., a merchant or business authority) or to a third-party relied upon by the controlling-entity. This exposes an individual's personal biometric information to the possibility of theft and fraudulent use. Further, controlling entities must either assume the risks and liabilities of storing this data, or trust the data to a third-party's care.

Second, conventional biometric authentication techniques generally require an individual to submit biometric information (e.g., a fingerprint, retinal scan, facial scan, or signature) for storage in a database that can then be later used for comparison with biometric data acquired at the point of transaction. This "enrollment" process is time-consuming, risky, error-prone and considered intrusive by many individuals. Further, the enrollment process must be repeated for each individual for every intended use. For example, a user may need to enroll for biometric authentication with his/her company (e.g., for secure access to facilities or digital files), and separately enroll with various merchants using biometric authentication for transactions. Thus, the individual has to spend significant time completing each separate enrollment, and additionally must trust each entity with his/her personal biometric information. For these reasons alone many individuals do not even consider these options.

The above-defined issues represent serious roadblocks to the widespread deployment and acceptance of conventional biometric authentication options. Unless the identified deficiencies are addressed, the full potential of biometric solutions will never be realized. Therefore, a new technology is needed that provides highly reliable, safe and efficient secure authentication for transaction-processing and/or access control. Moreover, the new technology should allow for a simple and efficient enrollment process that does not put an individual's highly personal information at risk of identity theft or other fraudulent use.

SUMMARY

A system and method provide efficient, secure and highly reliable authentication for transaction processing and/or access control applications. A portable physical device, referred to herein as a Personal Digital Key or "PDK", stores one or more profiles (e.g., a biometric profile) in a tamper-proof memory. The biometric profile is acquired in a secure trusted process and is uniquely associated with an individual that is authorized to use and is associated with the PDK. The PDK can wirelessly transmit the identification information including a unique PDK identification number and the biometric profile over a secure wireless channel for use in an authentication process. Additionally, the PDK can store other information such as credit/debit card information, bank information, or personal information in a memory for use in authorizing or completing a transaction.

Typically, a receiving device, referred to herein as a Reader, wirelessly receives the profile from the PDK in order to process a transaction or provide access to secure digital or physical assets. In one embodiment, the Reader acquires a biometric input from the individual carrying the PDK at the point of transaction. The biometric input can be acquired by, for example, a fingerprint scan, iris scan, retinal scan, palm scan, face scan, DNA analysis, signature analysis, voice analysis or any other input mechanism that provides physical or behavioral characteristics uniquely associated with the individual. The Reader compares the biometric profile received from the PDK to the biometric input obtained at the point of transaction to determine if a transaction should be authorized.

In one embodiment, the Reader is further adapted to communicate with one or more remote registries to provide an additional layer of security in the authentication process. Information transmitted from the PDK can be compared to entries stored in the registries to ensure the PDK (and its owner) have not participated in any fraudulent use and that the PDK is not invalid, lost or stolen. In yet another embodiment, one or more biometric authentications, remote registry authentications or other types of authentication are used in combination.

The features and advantages described in the specification are not all inclusive and in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
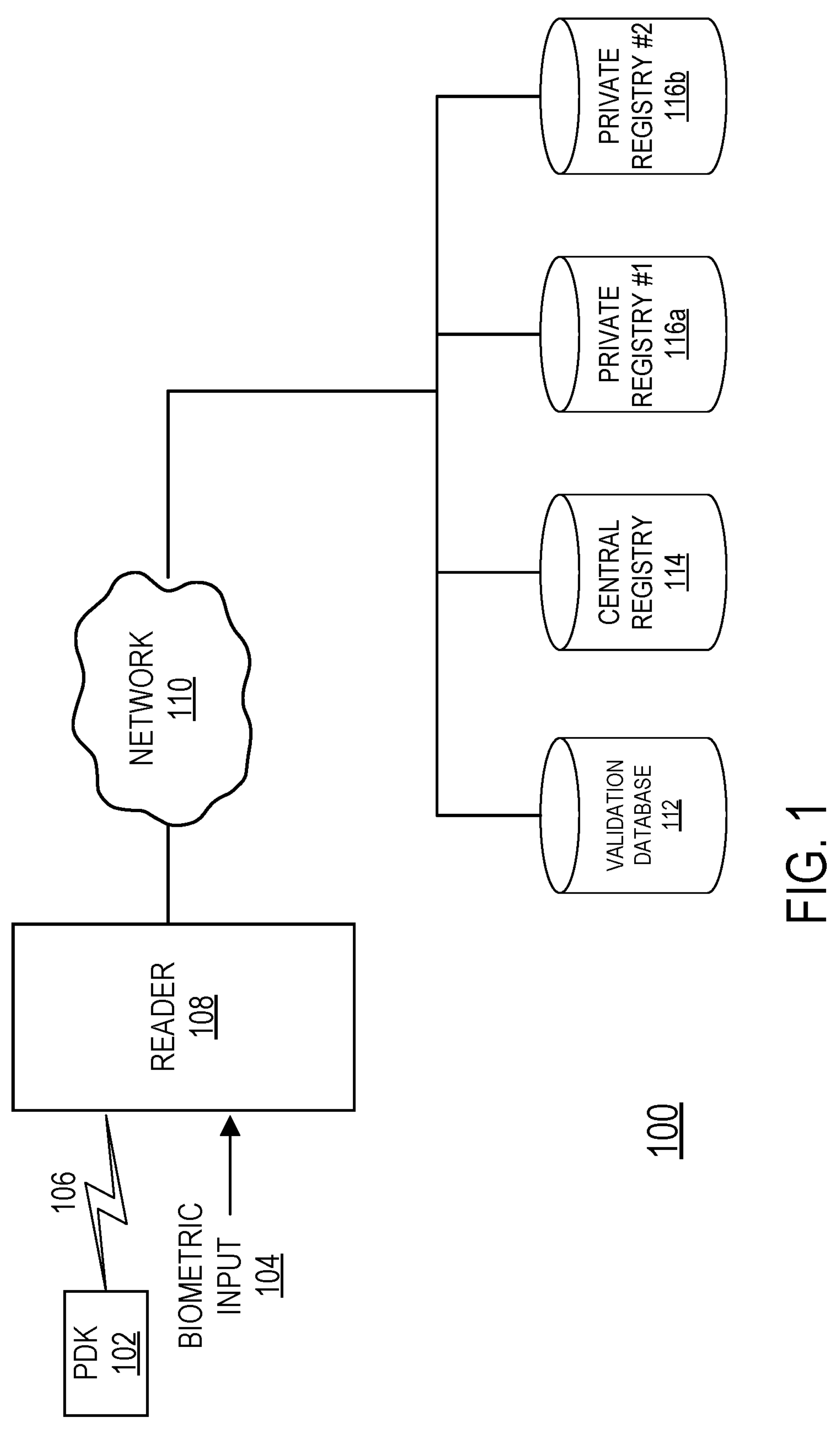
FIG. 1 is a high level block diagram illustrating a system for secure electronic authentication.

FIG. 1 is a high level block diagram illustrating a system for securely authenticating an individual for transaction-processing and/or access control applications. The system 100 comprises a Personal Digital Key (PDK) 102, a Reader 108, a network 110 and one or more external databases including a validation database 112, a Central Registry 114 and one or more private registries 116. The Reader 108 is coupled to the PDK 102 by a wireless link 106 and coupled to a network 110 by either a wired or wireless link. The Reader 108 is also adapted to receive a biometric input 104 from a user and is capable of displaying status to a user. The network 110 couples the validation database 112, the Central Registry 114 and two private registries 116 to the Reader 108. In alternative embodiments, different or additional external registries or databases may be coupled to the network 110. In another embodiment, the Reader 108 operates as a standalone device without a connection to the network 110.

The system 100 addresses applications where it is important to ensure a specific individual is authorized to perform a given transaction. A transaction as used herein can include executing a purchase or financial dealing, enabling access to physical and/or digital items, verifying identification or personal information or executing other tasks where it is important to authenticate an individual for use. Generally, the Reader 108 wirelessly receives information stored in the PDK 102 that uniquely identifies the PDK 102 and the individual carrying the PDK 102. The Reader 108 can also receive a biometric input 104 from the individual. Based on the received information, the Reader 108 determines if the transaction should be authorized. Beneficially, the system 100 provides comprehensive authentication without the need for PINs or passwords. Moreover, personal biometric information need not be stored in any local or remote storage database and is only stored on the user's own PDK. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary, that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in U.S. patent application Ser. No. 11/744,832 to John Giobbi et al., entitled "Personal Digital Key Initialization and Registration For Secure Transaction" filed on May 5, 2007, now U.S. Pat. No. 8,412,949, the entire contents of which are incorporated herein by reference.

The Reader 108 wirelessly communicates with the PDK 102 when the PDK 102 is within a proximity zone of the Reader 108. The proximity zone can be, for example, several meters in radius and can be adjusted dynamically by the Reader 108. Thus, in contrast to many conventional RF ID devices, the Reader 108 can detect and communicate with the PDK 102 without requiring the owner to remove the PDK 102 from his/her pocket, wallet, purse, etc. Generally, the Reader 108 receives uniquely identifying information from the PDK 102 and initiates an authentication process for the individual carrying the PDK 102. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment alleviates the need for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed at the Reader 108. For example, in purchase transactions, the validation database 112 is a credit card validation database that is separate from the merchant providing the sale. Alternatively, a different database may be used to validate different types of purchasing means such as a debit card, ATM card, or bank account number.

The registries 114-116 are securely-accessible databases coupled to the network 110 that store, among other items, PDK, Notary, and Reader information. In one embodiment, the registries 114-116 do not store biometric information. In an alternative embodiment, a registry stores biometric information in an encoded format that can only be recovered using an algorithm or encoding key stored in the PDK 102. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority, or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2:
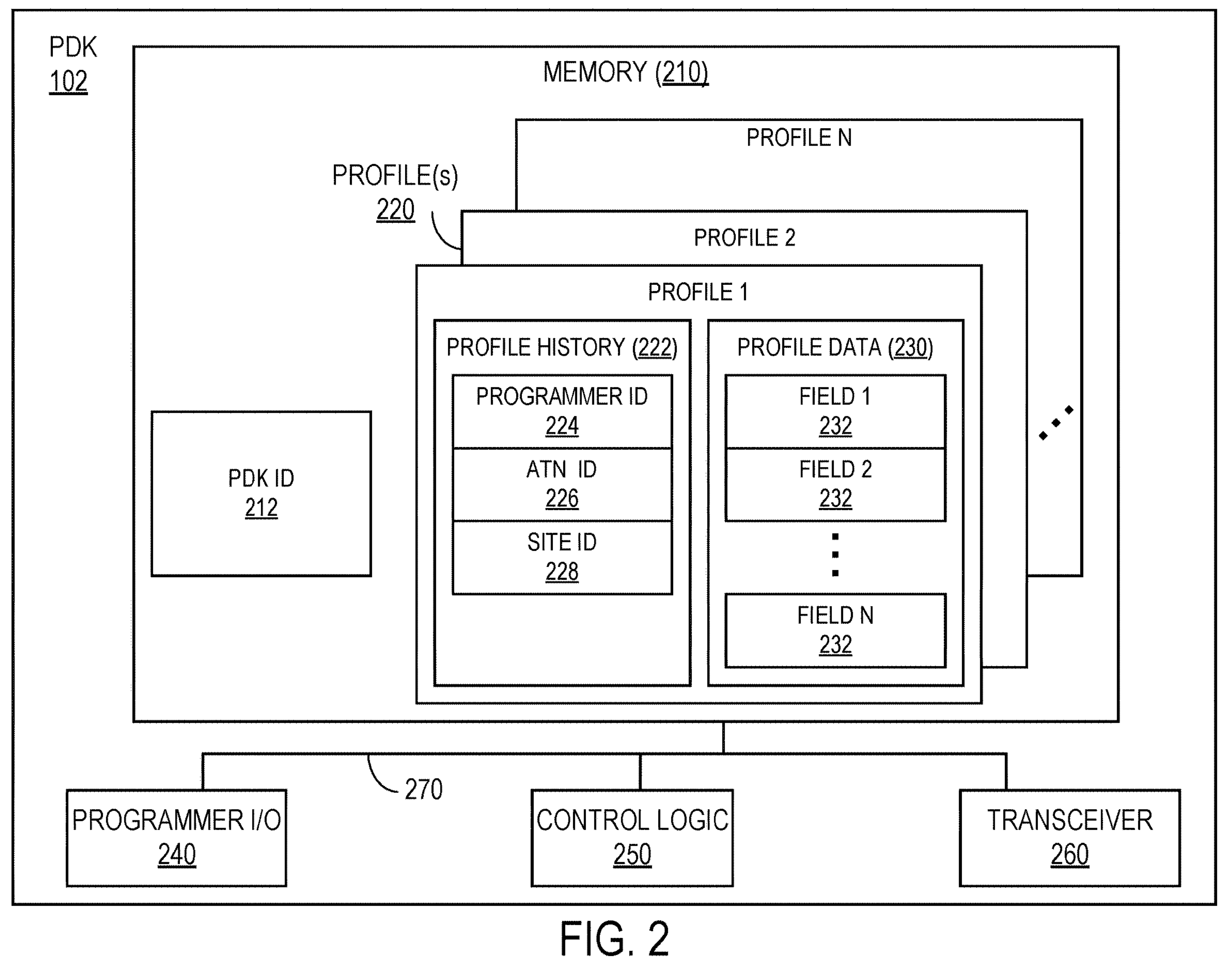
FIG. 2 is a block diagram illustrating one embodiment of a Personal Digital Key (PDK).

Turning now to FIG. 2, an example embodiment of a PDK 102 is illustrated. The PDK 102 comprises a memory 210, a programmer I/O 240, control logic 250, and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the biometric profile is further encoded using a encoding key and/or algorithm that is stored with the biometric profile data. Then, for authentication, both the biometric profile data and the encoding key and/or algorithm are passed to the Reader 108.

In one embodiment the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with reduced level of encryption while the full biometric profiles are only transmitted over secure channels. In the case of fingerprint authentication, for example, the biometric profile sample may represent only small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information, or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information are also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add or remove additional profiles, credit cards, personal information, etc. to the PDK 102 using a Programmer. For example, in one embodiment, a user that has unlocked his/her own PDK 102 can store additional biometric information (such as fingerprint information for other fingers) in his/her PDK 102. In another example, a user that cancels a credit card, can unlock his/her PDK 102 to remove the credit card information. In another embodiment, the user can make copies of the PDK 102 or move profiles from one PDK 102 to another once the PDK 102 is unlocked.

The profile history 222 includes a programmer ID field 224, a Notary ID 226, and a site ID field 228. The profile history 222 relates to the specific hardware, Notary, and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in U.S. patent application Ser. No. 11/744,832 to John Giobbi et al., entitled "Personal Digital Key Initialization and Registration For Secure Transaction" filed on May 5, 2007, now U.S. Pat. No. 8,412,949, the entire contents of which are incorporated herein by reference. The programmer I/O 240 can be, for example, a USB interface, serial interface, parallel interface, or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates, or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 3:
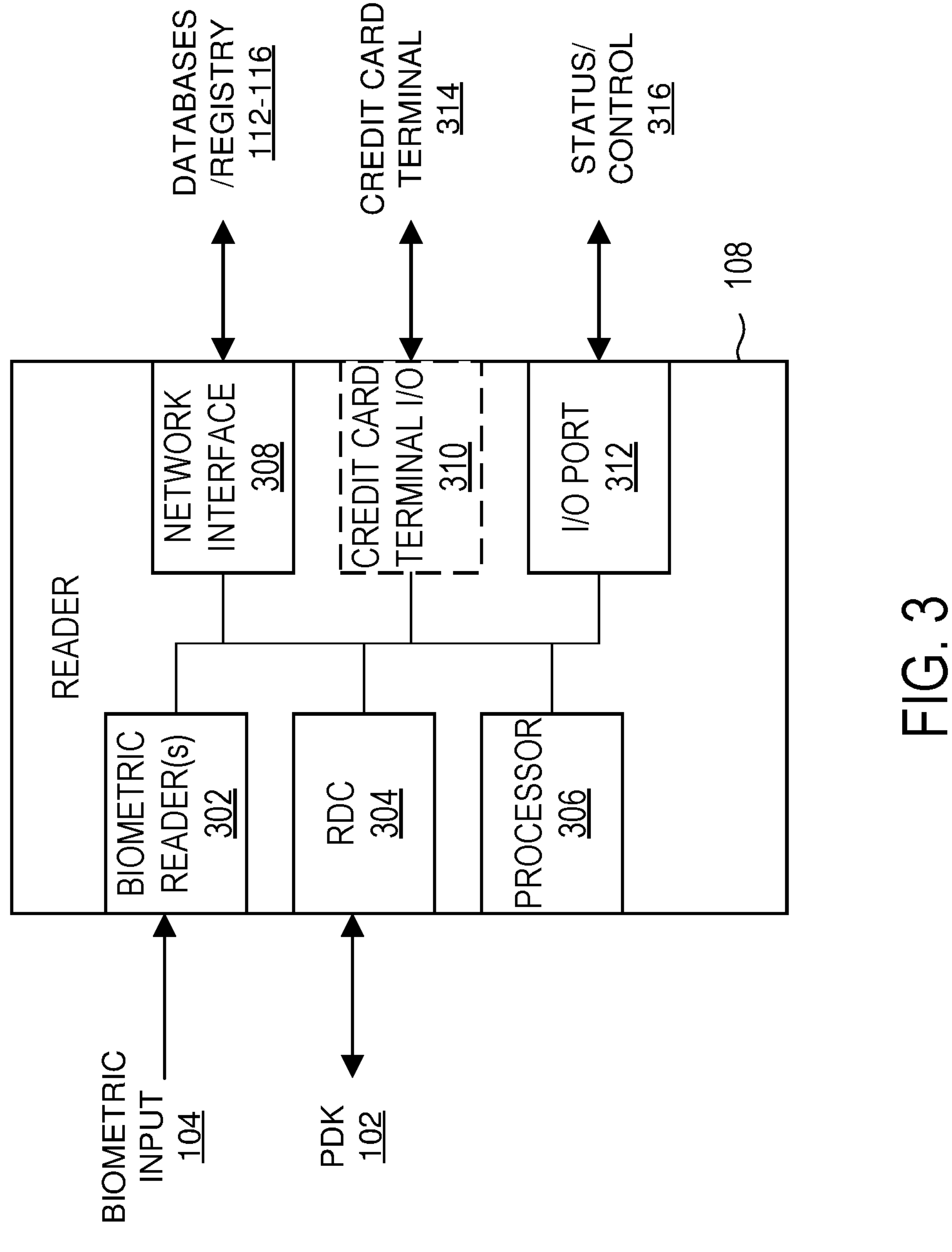
FIG. 3 is a block diagram illustrating one embodiment of a Reader.

Turning now to FIG. 3, an example embodiment of a Reader 108 is illustrated. The embodiment includes one or more biometric readers 302, a receiver-decoder circuit (RDC) 304, a processor 306, a network interface 308, an I/O port 312 and optionally a credit card terminal I/O 310. In alternative embodiments, different or additional modules can be included in the Reader 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones, and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306, and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

In one embodiment, a Reader 108 is adapted to detect and prevent fraudulent use of PDKs that are lost, stolen, revoked, expired or otherwise invalid. For example, the Reader 108 can download lists of invalid PDKs IDs 212 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDK IDs 212. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send alarm signals indicating that the PDK 102 a stolen device. Here, a stolen PDK 102 can be tracked, located and recovered by monitoring the alarm signals. In one embodiment, the Reader 108 stores biometric or other identifying information from an individual that attempts to fraudulently use a PDK 102 so that the individual's identity can be determined.

Generally, the Reader 108 is configured to implement at least one type of authentication prior to enabling a transaction. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is required to initiate the transaction. For example, a Reader 108 may be configured to use only device authentication for low cost purchases under a predefined amount (e.g., $25). The configuration is also useful in other types of low risk transactions where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
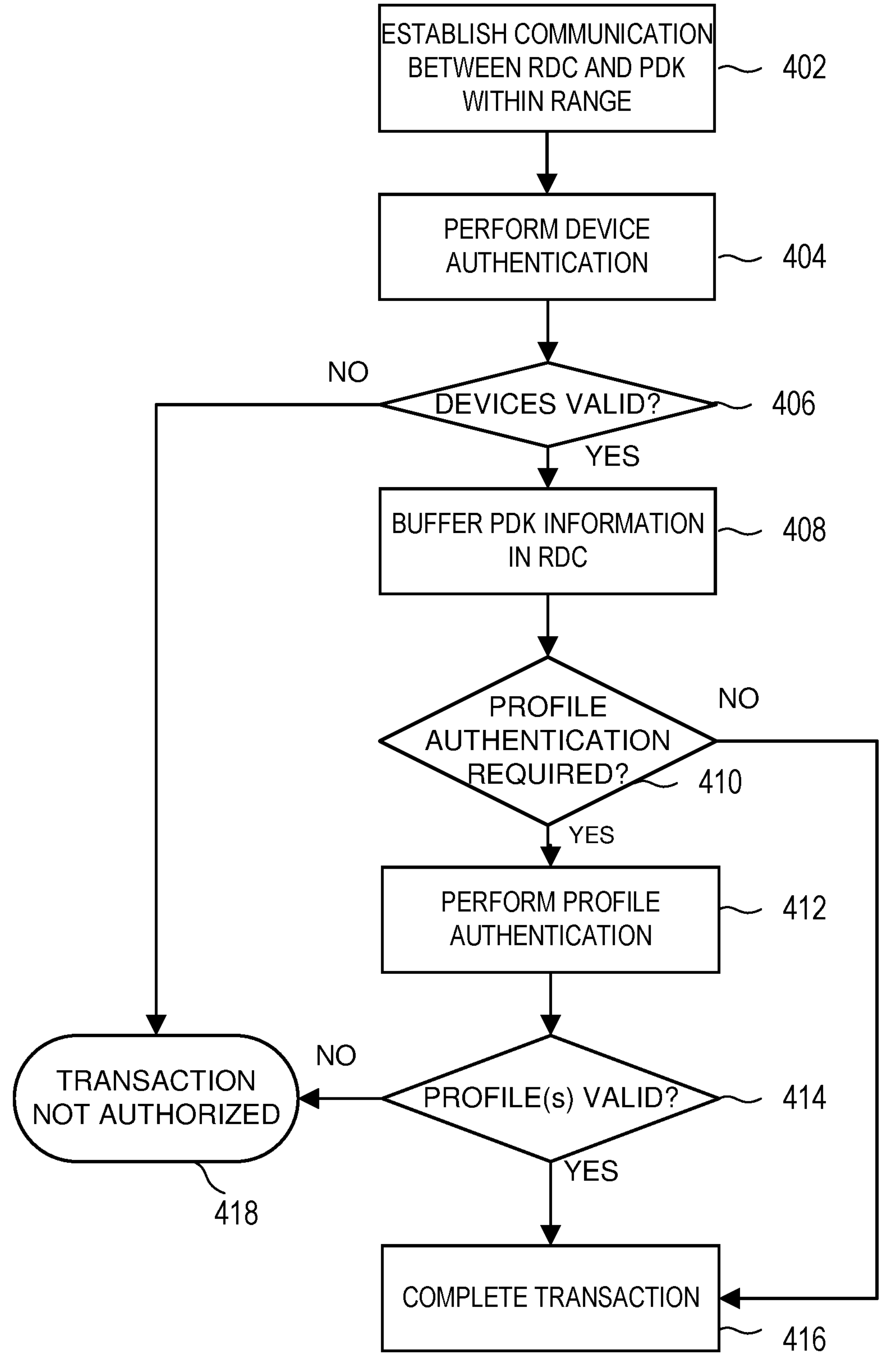
FIG. 4 is a flowchart illustrating one embodiment of a process for authorizing a transaction using secure authentication.

FIG. 4 illustrates an example embodiment of a process for secure authentication of a transaction. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
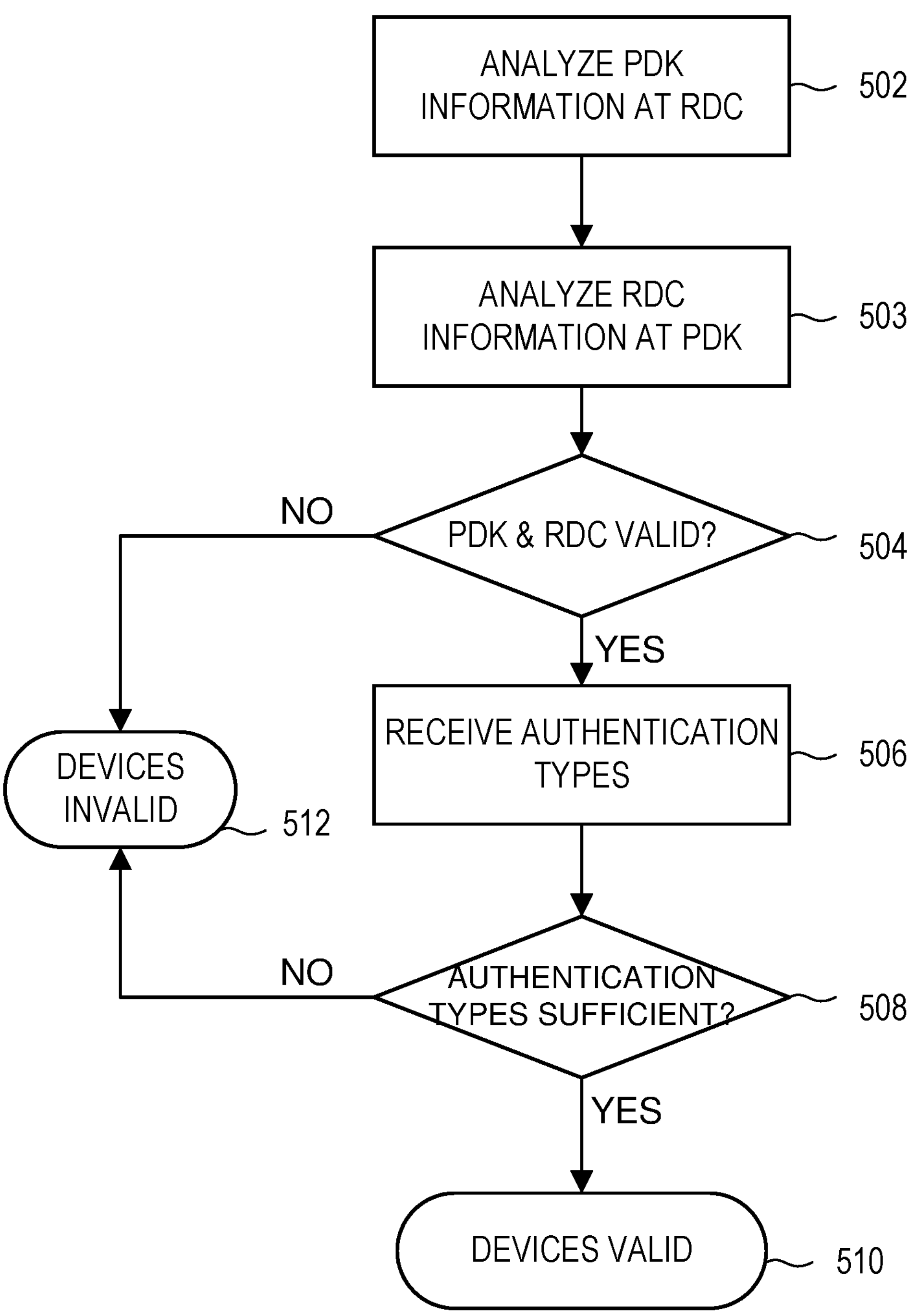
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes charging a credit card for a purchase. Alternatively, bank information, debit/check/ATM card information, coupon codes, or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
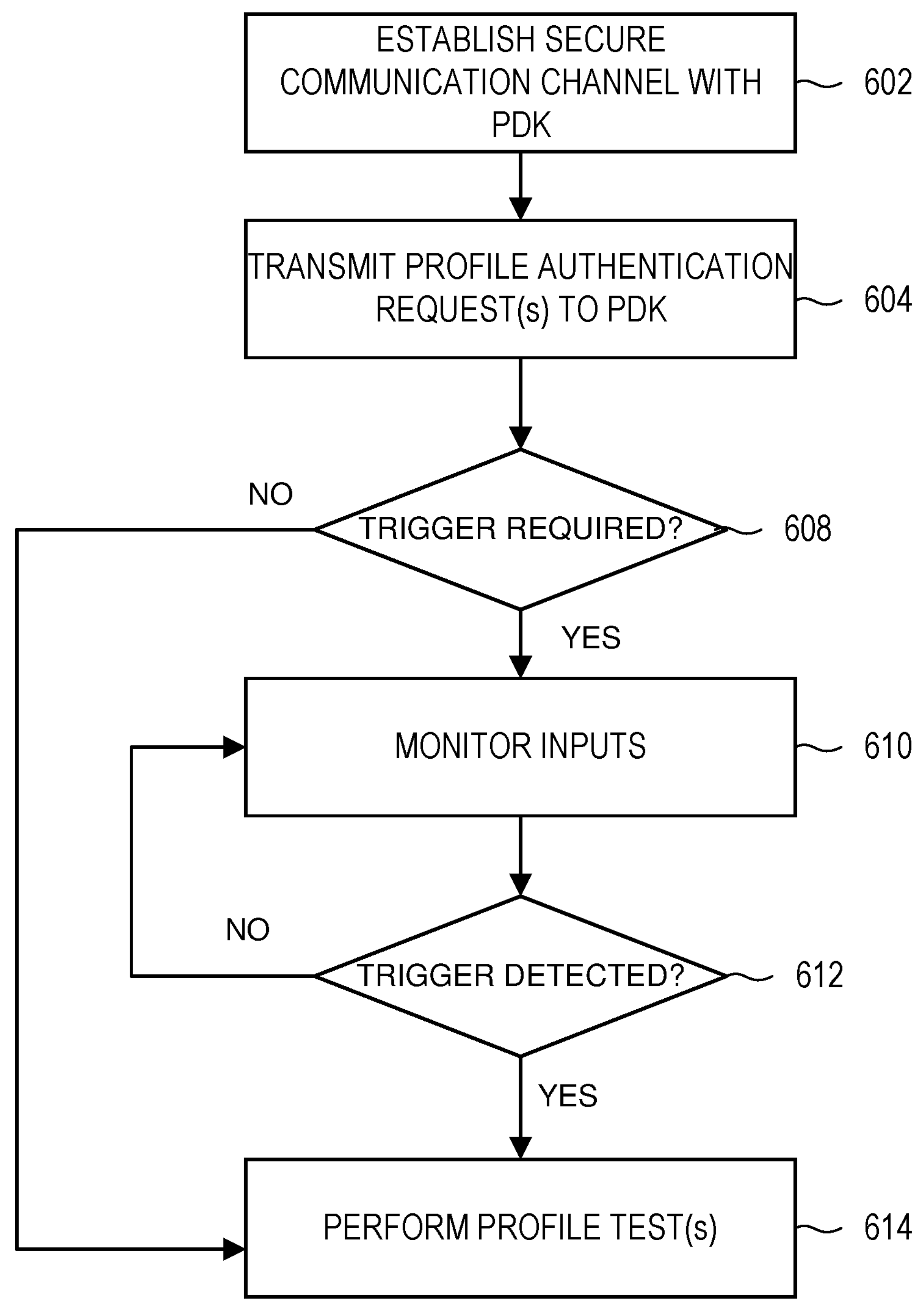
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused, or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample, or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert, or a movie). When a PDK owner walks through the entrance, the Reader 108 detects the PDK 102 within range, authenticates the user, and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room, or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication test. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 7B:
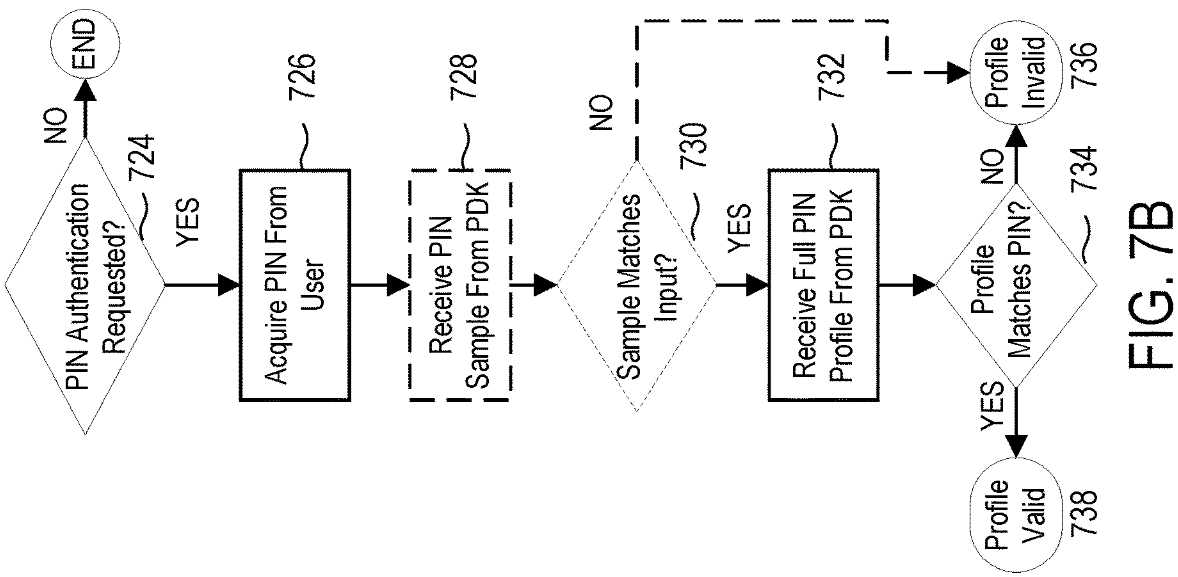
FIG. 7B is a flowchart illustrating one embodiment of a process for profile testing using a personal identification number.
Figure 7A:
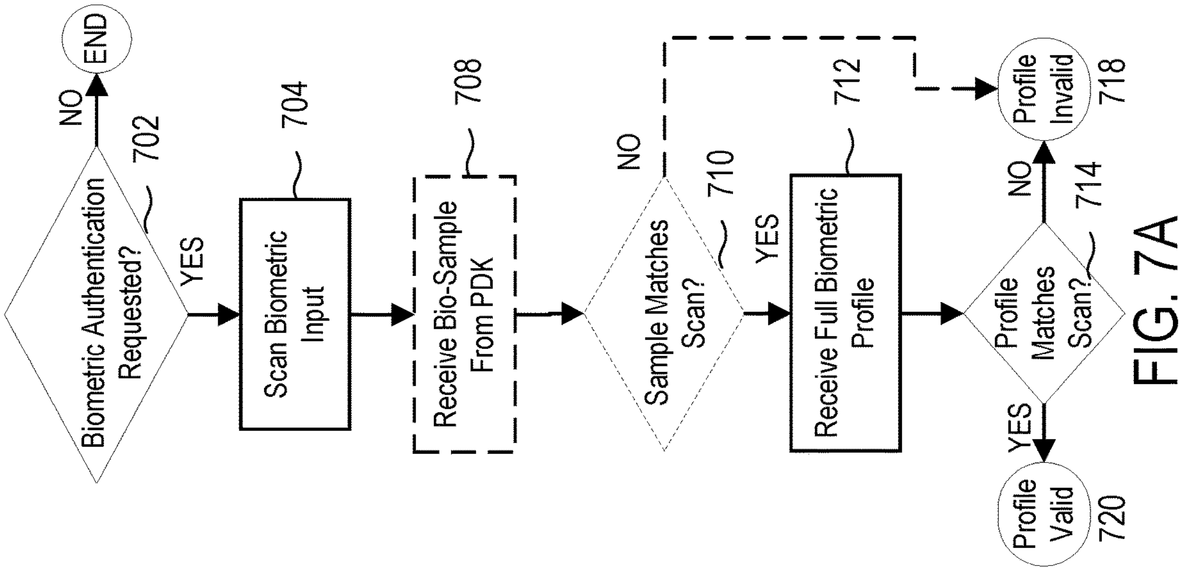
FIG. 7A is a flowchart illustrating one embodiment of a process for profile testing using a biometric input.

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed. In one embodiment, the biometric profile and/or biometric profile sample is encoded and transmitted to the Reader 108 along with an encoding key and/or algorithm. Then, the Reader 108 uses the encoding key and/or algorithm to recover the biometric profile and/or biometric profile sample. In another alternative embodiment, only the encoding key and/or algorithm is transmitted by the PDK 102 and the biometric profile data is recovered from a remote database in an encoded form that can then be decoded using the key and/or algorithm.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108, or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108, and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figure 7D:
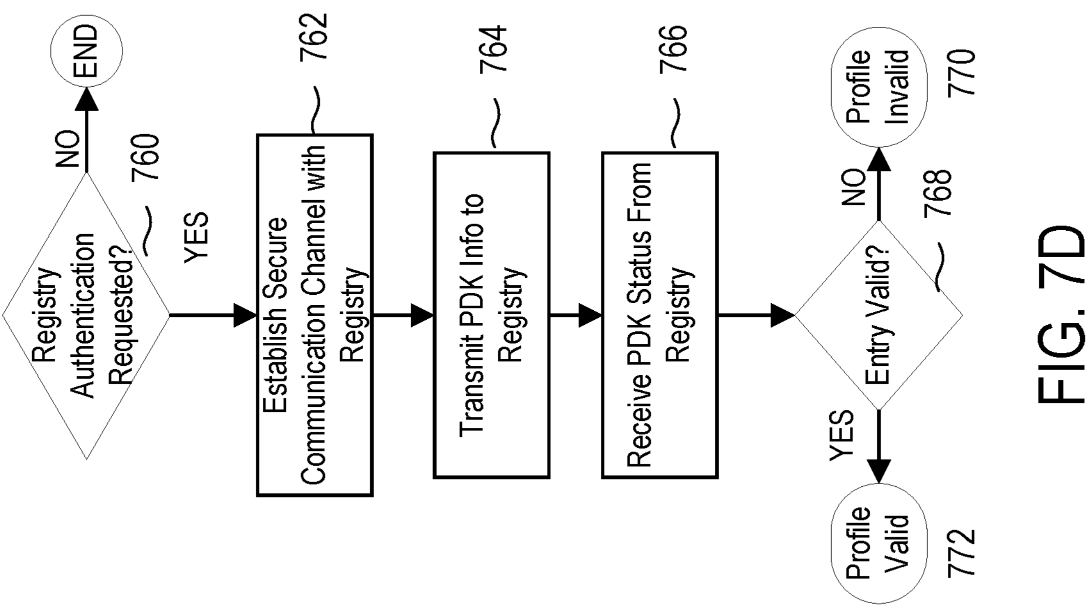
FIG. 7D is a flowchart illustrating one embodiment of a process for profile testing using a private or central registry.
Figure 7C:
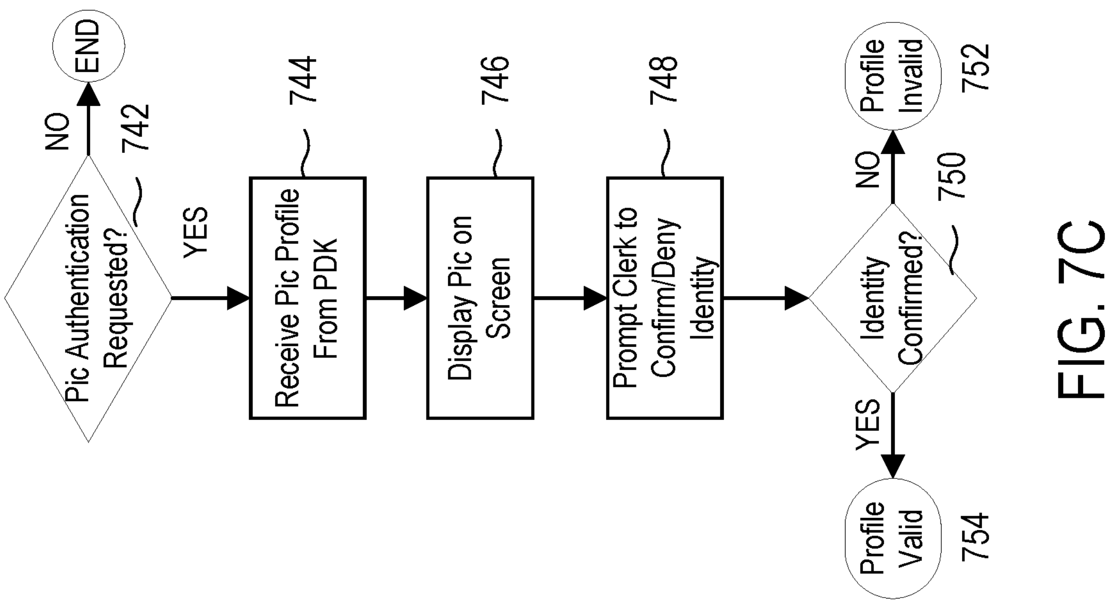
FIG. 7C is a flowchart illustrating one embodiment of a process for profile testing using a picture profile.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116, or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:

determining a request for a transaction having a transaction amount;

determining that the transaction amount associated with the transaction is under a threshold;

detecting that a portable user device is within a proximity zone of a reader device; and establishing a wireless communication channel between the reader device and the portable user device within the proximity zone of the reader device and transmitting the request for the transaction including the transaction amount and device identification information uniquely identifying the portable user device from the portable user device to the reader device via the wireless communication channel without an authentication of a user associated with the portable user device, the device identification information stored in a read-only format in a secured memory of the portable user device and unchangeable subsequent to a manufacture of the portable user device, the reader device locally authenticating that the portable user device is valid using the device identification information without any remote lookup, the reader device automatically performing the transaction responsive to detecting that the portable user device is within the proximity zone of the reader device, determining that the transaction amount associated with the transaction is under the threshold, and locally authenticating the portable user device is valid, the reader device synchronized with a trusted third-party system to periodically retrieve updated list of valid devices and their registered uniquely identifying device identification information from the trusted third-party system at regular time intervals for performing local authentication of portable user devices without any remote lookup.

2. The method of claim 1, further comprising:

responsive to determining that the transaction amount associated with the transaction is not under the threshold, receiving a request for performing a biometric profile authentication;

determining that the biometric profile authentication is successful; and responsive to determining that the biometric profile authentication is successful and detecting that the portable user device is within the proximity zone of the reader device, transmitting the request for the transaction having the transaction amount and the device identification information uniquely identifying the portable user device from the portable user device to the reader device via the wireless communication channel.

3. The method of claim 2, wherein the biometric profile authentication includes at least one of a fingerprint scan authentication, a facial scan authentication, a voice analysis authentication, an iris scan authentication or a retinal scan authentication.

4. The method of claim 2, wherein determining that the biometric profile authentication is successful comprises:

acquiring, by the portable user device, a facial image of the user;

comparing, by the portable user device, the facial image of the user and a biometric profile stored in the portable user device; and responsive to the comparing, determining that the facial image of the user matches the biometric profile.

5. The method of claim 1, further comprising presenting a representation of a default payment option associated with the transaction to a user and allowing the user to select another payment option for the transaction from a plurality of payment options.

6. The method of claim 5, wherein the plurality of payment options are stored by the portable user device and each payment option is associated with a funding source to be used to complete the transaction.

7. The method of claim 1, wherein the reader device is configured to request a validation of the transaction from the trusted third-party system and automatically perform the transaction responsive to receiving the validation of the transaction from the trusted third-party system.

8. The method of claim 1, wherein the reader device is associated with a point of sale terminal and the transaction includes a purchase.

9. The method of claim 1, wherein the portable user device includes at least one of a wearable device or a cellular phone.

10. The method of claim 1, further comprising storing data in association with the transaction in the portable user device responsive to the reader device automatically performing the transaction.

11. The method of claim 10, wherein the data in association with the transaction includes one or more of a name of a merchant, a purchase amount, and a payment option used for the transaction.

12. A system comprising:

a computing device and a memory including instructions that, when executed by the computing device, cause the system to perform operations including:

determining a request for a transaction having a transaction amount;

determining that the transaction amount associated with the transaction is under a threshold;

detecting that a portable user device is within a proximity zone of a reader device; and establishing a wireless communication channel between the reader device and the portable user device within the proximity zone of the reader device and transmitting the request for the transaction including the transaction amount and device identification information uniquely identifying the portable user device from the portable user device to the reader device via the wireless communication channel without an authentication of a user associated with the portable user device, the device identification information stored in a read-only format in a secured memory of the portable user device and unchangeable subsequent to a manufacture of the portable user device, the reader device locally authenticating that the portable user device is valid using the device identification information without any remote lookup, the reader device automatically performing the transaction responsive to detecting that the portable user device is within the proximity zone of the reader device, determining that the transaction amount associated with the transaction is under the threshold, and locally authenticating the portable user device is valid, the reader device synchronized with a trusted third-party system to periodically retrieve updated list of valid devices and their registered uniquely identifying device identification information at regular time intervals from the trusted third-party system for performing local authentication of portable user devices without any remote lookup.

13. The system of claim 12, further comprising:

responsive to determining that the transaction amount associated with the transaction is not under the threshold, receiving a request for performing a biometric profile authentication;

determining that the biometric profile authentication is successful; and responsive to determining that the biometric profile authentication is successful and detecting that the portable user device is within the proximity zone of the reader device, transmitting the request for the transaction having the transaction amount and the device identification information uniquely identifying the portable user device from the portable user device to the reader device via the wireless communication channel.

14. The system of claim 13, wherein the biometric profile authentication includes at least one of a fingerprint scan authentication, a facial scan authentication, a voice analysis authentication, an iris scan authentication or a retinal scan authentication.

15. The system of claim 13, wherein determining that the biometric profile authentication is successful comprises:

acquiring, by the portable user device, a facial image of the user;

comparing, by the portable user device, the facial image of the user and a biometric profile stored in the portable user device; and responsive to the comparing, determining that the facial image of the user matches the biometric profile.

16. The system of claim 12, further comprising presenting a representation of a default payment option associated with the transaction to a user and allowing the user to select another payment option for the transaction from a plurality of payment options.

17. The system of claim 16, wherein the plurality of payment options are stored by the portable user device and each payment option is associated with a funding source to be used to complete the transaction.

18. The system of claim 12, wherein the reader device is configured to request a validation of the transaction from the trusted third-party system and automatically perform the transaction responsive to receiving the validation of the transaction from the trusted third-party system.

19. The system of claim 12, wherein the reader device is associated with a point of sale terminal and the transaction includes a purchase.

20. The system of claim 12, wherein the portable user device includes at least one of a wearable device or a cellular phone.

* * * * *